United States Patent
Amin et al.

(10) Patent No.: US 12,190,203 B2
(45) Date of Patent: *Jan. 7, 2025

(54) SYSTEM AND METHODS FOR ACHIEVING ORTHOGONAL CONTROL OF NON-ORTHOGONAL QUBIT PARAMETERS

(71) Applicant: D-WAVE SYSTEMS INC., Burnaby (CA)

(72) Inventors: Mohammad H. Amin, Coquitlam (CA); Trevor Michael Lanting, Vancouver (CA); Colin Enderud, Vancouver (CA)

(73) Assignee: D-WAVE SYSTEMS INC., Burnaby (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/385,226

(22) Filed: Oct. 30, 2023

(65) Prior Publication Data

US 2024/0185104 A1  Jun. 6, 2024

Related U.S. Application Data

(60) Continuation of application No. 17/234,469, filed on Apr. 19, 2021, now Pat. No. 11,836,574, which is a
(Continued)

(51) Int. Cl.
   *G06N 10/00*   (2022.01)
(52) U.S. Cl.
   CPC .................................... *G06N 10/00* (2019.01)
(58) Field of Classification Search
   CPC ........................................................ B82Y 10/00
   See application file for complete search history.

(56) References Cited

U.S. PATENT DOCUMENTS

| 5,113,352 A | 5/1992 | Finnerty |
| 6,838,694 B2 | 1/2005 | Esteve et al. |

(Continued)

FOREIGN PATENT DOCUMENTS

| JP | 2010233066 A | 10/2010 |
| WO | 2005093649 A1 | 10/2005 |

(Continued)

OTHER PUBLICATIONS

Lim et al. "Coupling of Josephson current qubits using a connecting loop", arXiv:cond-mat/0305127v3 [cond-mat.mes-hall] Sep. 24, 2004, pp. 6.*

(Continued)

*Primary Examiner* — Li Wu Chang
(74) *Attorney, Agent, or Firm* — Cozen O'Connor

(57) ABSTRACT

Achieving orthogonal control of non-orthogonal qubit parameters of a logical qubit allows for increasing the length of a qubit chain thereby increasing the effective connectivity of the qubit chain. A hybrid qubit is formed by communicatively coupling a dedicated second qubit to a first qubit. By tuning a programmable parameter of the second qubit of a hybrid qubit, an effective programmable parameter of the hybrid qubit is adjusted without affecting another effective programmable parameter of the hybrid qubit thereby achieving orthogonal control of otherwise non-orthogonal qubit parameters. The length of the logical qubit may thus be increased by communicatively coupling a plurality of such hybrid qubits together.

10 Claims, 7 Drawing Sheets

Related U.S. Application Data division of application No. 15/641,051, filed on Jul. 3, 2017, now Pat. No. 11,010,683, which is a division of application No. 14/339,289, filed on Jul. 23, 2014, now Pat. No. 9,727,823.

(60) Provisional application No. 61/857,601, filed on Jul. 23, 2013.

(56) References Cited

U.S. PATENT DOCUMENTS

| | | |
|---|---|---|
| 6,988,058 B1 | 1/2006 | Sherwin et al. |
| 7,135,701 B2 | 11/2006 | Amin et al. |
| 7,277,872 B2 | 10/2007 | Raussendorf et al. |
| 7,335,909 B2 | 2/2008 | Amin et al. |
| 7,418,283 B2 | 8/2008 | Amin |
| 7,533,068 B2 | 5/2009 | Maassen et al. |
| 7,619,437 B2 | 11/2009 | Thom et al. |
| 7,624,088 B2 | 11/2009 | Johnson et al. |
| 7,788,192 B2 | 8/2010 | Amin |
| 7,843,209 B2 | 11/2010 | Berkley |
| 7,870,087 B2 | 1/2011 | Macready et al. |
| 7,876,248 B2 | 1/2011 | Berkley et al. |
| 7,877,333 B2 | 1/2011 | Macready |
| 7,984,012 B2 | 7/2011 | Coury et al. |
| 8,008,942 B2 | 8/2011 | Van et al. |
| 8,018,244 B2 | 9/2011 | Berkley |
| 8,032,474 B2 | 10/2011 | Macready et al. |
| 8,035,540 B2 | 10/2011 | Berkley et al. |
| 8,073,808 B2 | 12/2011 | Rose |
| 8,098,179 B2 | 1/2012 | Bunyk et al. |
| 8,169,231 B2 | 5/2012 | Berkley |
| 8,174,305 B2 | 5/2012 | Harris |
| 8,175,995 B2 | 5/2012 | Amin |
| 8,190,548 B2 | 5/2012 | Choi |
| 8,195,596 B2 | 6/2012 | Rose et al. |
| 8,244,662 B2 | 8/2012 | Coury et al. |
| 8,421,053 B2 | 4/2013 | Bunyk et al. |
| 8,536,566 B2 | 9/2013 | Johansson et al. |
| 8,700,689 B2 | 4/2014 | Macready et al. |
| 8,854,074 B2 | 10/2014 | Berkley |
| 9,129,224 B2 | 9/2015 | Lanting et al. |
| 9,170,278 B2 | 10/2015 | Neufeld |
| 9,178,154 B2 | 11/2015 | Bunyk |
| 9,183,508 B2 | 11/2015 | King |
| 9,218,567 B2 | 12/2015 | Macready et al. |
| 9,424,526 B2 | 8/2016 | Ranjbar |
| 9,501,474 B2 | 11/2016 | Gopalakrishnan |
| 9,501,747 B2 | 11/2016 | Roy |
| 9,710,758 B2 | 7/2017 | Bunyk et al. |
| 9,727,823 B2 | 8/2017 | Amin et al. |
| 9,875,215 B2 | 1/2018 | Macready et al. |
| 9,881,256 B2 | 1/2018 | Hamze et al. |
| 10,002,107 B2 | 6/2018 | Lanting |
| 10,552,755 B2 | 2/2020 | Lanting et al. |
| 10,789,540 B2 | 9/2020 | King et al. |
| 11,023,821 B2 | 6/2021 | Harris et al. |
| 2002/0190249 A1 | 12/2002 | Williams et al. |
| 2005/0167658 A1 | 8/2005 | Williams et al. |
| 2005/0250651 A1 | 11/2005 | Amin et al. |
| 2005/0262179 A1 | 11/2005 | Tucci |
| 2008/0052055 A1 | 2/2008 | Rose et al. |
| 2008/0086438 A1 | 4/2008 | Amin et al. |
| 2008/0176750 A1 | 7/2008 | Rose et al. |
| 2008/0218519 A1 | 9/2008 | Coury et al. |
| 2008/0238531 A1 | 10/2008 | Harris |
| 2008/0258753 A1 | 10/2008 | Harris |
| 2009/0241013 A1 | 9/2009 | Roetteler |
| 2011/0018612 A1 | 1/2011 | Harris |
| 2011/0022820 A1 | 1/2011 | Bunyk et al. |
| 2011/0057169 A1 | 3/2011 | Harris et al. |
| 2011/0060711 A1 | 3/2011 | Macready et al. |
| 2011/0231462 A1 | 9/2011 | Macready et al. |
| 2011/0238607 A1 | 9/2011 | Coury et al. |
| 2012/0094838 A1 | 4/2012 | Bunyk et al. |
| 2013/0005580 A1 | 1/2013 | Bunyk et al. |
| 2014/0187427 A1 | 7/2014 | Macready et al. |
| 2014/0250288 A1 | 9/2014 | Roy |
| 2014/0324933 A1 | 10/2014 | Macready et al. |
| 2015/0032993 A1 | 1/2015 | Amin et al. |
| 2018/0246848 A1 | 8/2018 | Douglass et al. |
| 2019/0019101 A1 | 1/2019 | Neven |
| 2022/0391744 A1 | 12/2022 | Boothby et al. |

FOREIGN PATENT DOCUMENTS

| | | |
|---|---|---|
| WO | 2006066415 A1 | 6/2006 |
| WO | 2007085074 A1 | 8/2007 |
| WO | 2009039634 A1 | 4/2009 |
| WO | 2009143166 A2 | 11/2009 |
| WO | 2012064974 A2 | 5/2012 |
| WO | 2013006836 A1 | 1/2013 |
| WO | 2017075246 A1 | 5/2017 |

OTHER PUBLICATIONS

Berkley, A.J. et al., "Tunneling Spectroscopy Using a Probe Qubit," arXiv:1210.6310v2 [cond-mat.supr-con], Jan. 3, 2013, 5 pages.

Grajcar et al., "Four-Qubit Device with Mixed Couplings", Physical Review Letters, Feb. 3, 2006. https://journals.aps.org/prl/abstract/10.1103/PhysRevLett.96.047006.

Maassen van den Brink, "Galvanic coupling of flux qubits simple theory and tunability", (cond-mat.supr-con), May 16, 2006. https://arxiv.org/abs/cond-mat/0605398.

Van Der Ploeg et al., "Controllable Coupling of Superconducting Flux Qubits," arXiv: cond-mat/0605588v3, May 23, 2007.

Almeida, J. et al., "Probing Quantum Coherence in Qubit Arrays," J. Phys. B: At. Mol. Opt. Phys. vol. 46, 2013, 8 pages.

Amin et al., "Systems and Methods for Achieving Orthogonal Control of Non-Orthogonal Qubit Parameters," U.S. Appl. No. 61/857,601, filed Jul. 23, 2013, 89 pages.

Amin, "Effect of Local Minima on Adiabatic Quantum Optimization," arXiv:0709.0528v2, Apr. 4, 2008.

Bian et al., "Discrete optimization using quantum annealing on sparse Ising models", Frontiers in Physics, Sep. 18, 2014.

Blatter et al., "Design aspects of superconducting-phase quantum bits," Physical Review B 63: 174511-1-174511-9, 2001.

Bocko et al., "Prospects for Quantum Coherent Computation Using Superconducting Electronics," IEEE Transactions on Applied Superconductivity 7(2):3638-3641, Jun. 1997.

Boothby et al., "Fast Clique Minor Generation in Chimera Qubit Connectivity Graphs", arXiv:1507.04774v1, 2015.

Boros et al., "Local search heuristics for Quadratic Unconstrained Binary Optimization (QUBO)", Springer, Feb. 21, 2007.

Bunyk, "D-Wave processor control circuitry", 2009.

Bunyk, "Quantum Processor With Instance Programmable Qubit Connectivity," U.S. Appl. No. 61/983,370, filed Apr. 23, 2014, 53 pages.

Chittineni et al., "Optimal Parameter Selection for Unsupervised Neural Network Using Genetic Algorithm," International Journal of Computer Science, Engineering and Applications (IJCSEA) 3(5):13-27, 2013.

Choi, "Minor-embedding in adiabatic quantum computation: II. Minor-universal graph design", Springer, Oct. 13, 2010.

Choi, Vicky. "Minor-embedding in adiabatic quantum computation: I. The parameter setting problem." arXiv:0804.4884v1. Apr. 30, 2008.

Clarke et al., "Superconducting quantum bits," Nature 453:1031-1042, Jun. 19, 2008.

Conlon, David "An Extremal Theorem in the Hypercube," The Electronic Journal of Combinations 17:1 (2010), 6 pages.

Devoret et al., "Superconducting Circuits for Quantum Information: An Outlook," Science 339:1169-1174, Mar. 8, 2013.

Devoret et al., "Superconducting Qubits: A Short Review," arXiv:cond-mat/0411174v1, Nov. 7, 2004, 41 pages.

Douglass et al., "Systems, Devices, Articles, and Methods for Quantum Processor Architecture," U.S. Appl. No. 62/114,406, filed Feb. 10, 2015, 105 pages.

(56) References Cited

OTHER PUBLICATIONS

Farhi et al., "Quantum Adiabatic Evolution Algorithms versus Simulated Annealing," MIT-CTP #3228, arXiv:quant-ph/0201031 v1, pp. 1-16, Jan. 8, 2002.
Feynman, "Simulating Physics with Computers," International Journal of Theoretical Physics 21(6/7): 467-488, 1982.
Friedman et al., "Quantum superposition of distinct macroscopic states," Nature 406:43-46, Jul. 6, 2000.
Fruchterman, et al., "Graph Drawing by Force-directed Placement", Software- Practice and Experience, vol. 21(1 1), 1129-1164 (Nov. 1991).
Gaitan, Frank, and Lane Clark. "Graph isomorphism and adiabatic quantum computing." Physical Review A 89.2 (2014): 022342. ( Year: 2014).
Hamze et al., "Systems and Methods for Problem Solving Via Solvers Employing Problem Modification," U.S. Appl. No. 62/040,643, filed Aug. 22, 2014, 80 pages.
Harris et al., "A Compound Josephson Junction Coupler for Flux Qubits With Minimal Crosstalk," arXiv:0904.3784v3 [cond-mat.supr-con], Jul. 16, 2009, 5 pages.
Harris et al., "Phase transitions in a programmable quantum spin glass simulator", Science, Jul. 13, 2018.
Harris et al., "Experimental Demonstration of a Robust and Scalable Flux Qubit," arXiv:0909.4321v1, Sep. 24, 2009, 20 pages.
Harris et al., "Experimental Investigation of an Eight-Qubit Unit Cell in a Superconducting Optimization Processor," arXiv:1004.1628v2, Jun. 28, 2010, 16 pages.
Heckmann et al., "Optimal Embedding of Complete Binary Trees into Lines and Grids", Lecture Notes in in Computer Science 2269, 1991.
Il'ichev et al., "Continuous Monitoring of Rabi Oscillations in a Josephson Flux Qubit," arXiv:cond-mat/0303433v1, Mar. 20, 2003.
International Search Report and Written Opinion, mailed Nov. 7, 2014, for corresponding International Application No. PCT/US2014/047874, 13 pages.
International Search Report, mailed Dec. 2, 2016, for PCT/US2016/015100, 3 pages.
Kamada, et al., "An Algorithm for Drawings General Undirected Graphs", Information Processing Letters 31 (1989)—7-15, North-Holland—Apr. 12, 1989. 9 pages.
King et al., "Systems and Methods for Embedding Problems Into an Analog Processor," U.S. Appl. No. 62/324,206, filed Apr. 18, 2016, 51 pages.
King, "Systems and Devices for Quantum Processor Architectures," U.S. Appl. No. 61/863,360, filed Aug. 7, 2013, 37 pages.
King, Andrew D., and Catherine C. McGeoch. "Algorithm engineering for a quantum annealing platform." arXiv preprint arXiv:1410.2628(2014). (Year: 2014).
Klymko et al., "Adiabatic Quantum Programming: Minor Embedding With Hard Faults", arXiv, Nov. 7, 2012.
Koren, "Drawing Graphs by Eigenvectors: Theory and Practice", Science Direct. Elsevier, Computers and Mathematics with Application 49 (2005) 1867-1888.
Lanting et al., "Systems and Methods for Increasing the Energy Scale of a Quantum Processor," U.S. Appl. No. 61/858,023, filed Jul. 24, 2013, 49 pages.
Lanting et al., "Systems and Methods for Improving the Performance of a Quantum Processor By Shimming to Reduce Intrinsic/Control Errors," U.S. Appl. No. 62/040,890, filed Aug. 22, 2014, 122 pages.
Layeb et al., "A New Quantum Evolutionary Local Search Algorithm for MAX 3-SAT Problem", Springer, 2008.
Lechner et al., "A quantum annealing architecture with all-to-all connectivity from local interactions", Science Advances. Oct. 23, 2015. https://advances.sciencemag.org/content/1/9/e1500838.
Levitov, et al., "Quantum Spin Chains and Majorana States in Arrays of Coupled Qubits," arXiv:cond-mat/0108266v2 [cond-mat.mes-hall]. Aug. 19, 2001, 7 pages.
Lyakhov et al., "Quantum State Transfer in Arrays of Flux Qubits," arXiv:cond-mat/0509478v1 [cond-mat.mes-hall], Sep. 19, 2005, 10 pages.
Makhlin et al., "Quantum-state engineering with Josephson-junction devices," arXIv:cond-mat/0011269v1, arXiv:cond-mat/0011269v1, Nov. 15, 2000.
Martinis, "Superconducting phase qubits," Quantum Inf Process 8:81-103, 2009.
Merrill et al., "Scalable GPU Graph Traversal", Nvidia, Feb. 1, 2012.
Mooij et al., "Josephson Persistent—Current Qubit," Science 285:1036-1039, Aug. 13, 1999.
Mutzel, "Optimization in graph drawing", Technische Universitat Wien, 2002.
Nielsen et al., "7.8 Other implementation schemes," in Quantum Computation and Quantum Information, 1st ed., Cambridge University Press, Cambridge, 2000, pp. 343-345.
Non Final Office Action for U.S. Appl. No. 17/234,469, mailed May 1, 2023, 19 pages.
Non-Final Office Action Issued in U.S. Appl. No. 16/988,232, mailed Jun. 14, 2023, 29 pages.
Orlando et al., "Superconducting persistent-current qubit," Physical Review B 60(22):15398-15413, Dec. 1, 1999.
Paauw, F.G., et al., "Tuning the Gap of a Superconducting Flux Qubit," arXiv:0812.1912v1 [cond-mat.supr-con] Dec. 10, 2008, 4 pages.
Pearson, "On lines and planes of closest fit to systems of points in space", Taylor and Francis Online, Jun. 8, 2010.
Perdomo-Ortiz et al., "A Performance Estimator for Quantum Annealers: Gauge Selection and Parameter Setting.," arXiv:1503.01083v1 [quant-ph], Mar. 3, 2015, 10 pages.
Rocchetto et al., "Stabilizers as a design tool for new forms of the Lechner-Hauke-Zoller annealer", Science Advances, Oct. 21, 2016.
Roy et al., "CRISP: Congestion reduction by iterated spreading during placement", IEEE, Dec. 28, 2009.
Shields et al., "Area efficient layouts of binary trees in grids", ACM Digital Library, 2001.
Shor, "Introduction to Quantum Algorithms," AT&T Labs—Research, arXiv:quant-ph/0005003 v2, pp. 1-17, Jul. 6, 2001.
Tabia, "Quantum Computing with Cluster States," 2011, retrieved from http://www.perimertinstitute.ca/personal/gtabia/notes/clusterStateQC.pdf, 18 pages.
Trummer, Immanuel, and Christoph Koch, "Multiple query optimization on there D-Wave 2X adiabatic quantum computer." arXiv preprint arXiv:1510.06437 (2015). (Year:2015) 12 pages.
Venturelli et al., "Quantum Optimization of Fully-Connected Spin Glasses", arXiv, Jun. 29, 2014.
Written Opinion, mailed Dec. 2, 2016, for PCT/US2016/015100, 14 pages.
Young et al., "Adiabatic quantum optimization with the wrong Hamiltonian", arXiv, Oct. 2, 2013.
Zagoskin et al., "Superconducting Qubits," arXiv:0805.0164v1, May 1, 2008.

\* cited by examiner

SYSTEM AND METHODS FOR ACHIEVING ORTHOGONAL CONTROL OF NON-ORTHOGONAL QUBIT PARAMETERS

BACKGROUND

Field

This disclosure generally relates to controlling the parameters of qubits in a quantum processor.

Quantum Devices

Quantum devices are structures in which quantum mechanical effects are observable. Quantum devices include circuits in which current transport is dominated by quantum mechanical effects. Such devices include spintronics, where electronic spin is used as a resource, and superconducting circuits. Both spin and superconductivity are quantum mechanical phenomena. Quantum devices can be used for measurement instruments, in computing machinery, and the like.

Quantum Computation

Quantum computation and quantum information processing are active areas of research and define classes of vendible products. A quantum computer is a system that makes direct use of quantum-mechanical phenomena, such as, superposition, tunneling, and entanglement, to perform operations on data. The elements of a quantum computer are not binary digits (bits) but typically are quantum binary digits or qubits. Quantum computers hold the promise of providing exponential speedup for certain classes of computation problems like simulating quantum physics. Useful speedup may exist for other classes of problems.

There are several types of quantum computers. An early proposal from Feynman in 1981 included creating artificial lattices of spins. More complicated proposals followed including a quantum circuit model where logical gates are applied to qubits in a time ordered way. In 2000, a model of computing was introduced for solving satisfiability problems; based on the adiabatic theorem this model is called adiabatic quantum computing. This model is believed useful for solving hard optimization problems and potentially other problems.

Adiabatic Quantum Computation

Adiabatic quantum computation typically involves evolving a system from a known initial Hamiltonian (the Hamiltonian being an operator whose eigenvalues are the allowed energies of the system) to a final Hamiltonian by gradually changing the Hamiltonian. A simple example of an adiabatic evolution is a linear interpolation between an initial Hamiltonian and a final Hamiltonian. An example is given by:

$$H_e = (1-s)H_i + sH_f \quad (1)$$

where $H_i$ is the initial Hamiltonian, $H_f$ is the final Hamiltonian, $H_e$ is the evolution or instantaneous Hamiltonian, and s is an evolution coefficient which controls the rate of evolution. As the system evolves, the evolution coefficient s goes from 0 to 1 such that at the beginning (i.e., s=0) the evolution Hamiltonian $H_e$ is equal to the initial Hamiltonian $H_i$ and at the end (i.e., s=1) the evolution Hamiltonian $H_e$ is equal to the final Hamiltonian $H_f$. Before the evolution begins, the system is typically initialized in a ground state of the initial Hamiltonian $H_i$ and the goal is to evolve the system in such a way that the system ends up in a ground state of the final Hamiltonian $H_f$ at the end of the evolution. If the evolution is too fast, then the system can be excited to a higher energy state, such as the first excited state. In the present systems and devices, an "adiabatic" evolution is an evolution that satisfies the adiabatic condition:

$$\dot{s}|\langle 1|dH_e/ds|0\rangle| = \delta g^2(s) \quad (2)$$

where $\dot{s}$ is the time derivative of s, g(s) is the difference in energy between the ground state and first excited state of the system (also referred to herein as the "gap size") as a function of s, and $\delta$ is a coefficient much less than 1. Generally the initial Hamiltonian $H_i$ and the final Hamiltonian $H_f$ don't commute. That is, $[H_i, H_f] \neq 0$.

The process of changing the Hamiltonian in adiabatic quantum computing may be referred to as evolution. The rate of change, for example, change of s, is slow enough that the system is always in the instantaneous ground state of the evolution Hamiltonian during the evolution, and transitions at anti-crossings (i.e., when the gap size is smallest) are avoided. The example of a linear evolution schedule is given above. Other evolution schedules are possible including non-linear, parametric, and the like. Further details on adiabatic quantum computing systems, methods, and apparatus are described in, for example, U.S. Pat. Nos. 7,135,701 and 7,418,283.

Quantum Annealing

Quantum annealing is a computation method that may be used to find a low-energy state, typically preferably the ground state, of a system. Similar in concept to classical annealing, the method relies on the underlying principle that natural systems tend towards lower energy states because lower energy states are more stable. However, while classical annealing uses classical thermal fluctuations to guide a system to a low-energy state and ideally its global energy minimum, quantum annealing may use quantum effects, such as quantum tunneling, to reach a global energy minimum more accurately and/or more quickly than classical annealing. In quantum annealing thermal effects and other noise may be present to aid the annealing. However, the final low-energy state may not be the global energy minimum. Adiabatic quantum computation, therefore, may be considered a special case of quantum annealing for which the system, ideally, begins and remains in its ground state throughout an adiabatic evolution. Thus, those of skill in the art will appreciate that quantum annealing systems and methods may generally be implemented on an adiabatic quantum computer. Throughout this specification and the appended claims, any reference to quantum annealing is intended to encompass adiabatic quantum computation unless the context requires otherwise.

Quantum annealing uses quantum mechanics as a source of disorder during the annealing process. The optimization problem is encoded in a Hamiltonian $H_P$, and the algorithm introduces quantum effects by adding a disordering Hamiltonian $H_D$ that does not commute with $H_P$. An example case is:

$$H_E \propto A(t)H_D + B(t)H_P \quad (3)$$

where A(t) and B(t) are time dependent envelope functions. The Hamiltonian $H_E$ may be thought of as an evolution Hamiltonian similar to $H_e$ described in the context of adiabatic quantum computation above. The disorder may be removed by removing $H_D$ (i.e., reducing A(t)). The disorder may be added and then removed. Thus, quantum annealing is similar to adiabatic quantum computation in that the system starts with an initial Hamiltonian and evolves through an evolution Hamiltonian to a final "problem" Hamiltonian $H_P$ whose ground state encodes a solution to the problem. If the evolution is slow enough, the system will typically settle in the global minimum (i.e., the exact solution), or in a local minimum close in energy to the exact solution. The performance of the computation may be assessed via the residual energy (difference from exact solution using the objective function) versus evolution time. The computation time is the time required to generate a residual energy below some acceptable threshold value. In quantum annealing, $H_P$ may encode an optimization problem but the system does not necessarily stay in the ground state at all times. The energy landscape of $H_P$ may be crafted so that its global minimum is the answer to the problem to be solved, and low-lying local minima are good approximations.

The reduction of the envelope function A(t) in quantum annealing may follow a defined schedule known as an annealing schedule. This is an example of an evolution schedule. Unlike traditional forms of adiabatic quantum computation where the system begins and remains in its ground state throughout the evolution, in quantum annealing the system may not remain in its ground state throughout the entire annealing schedule. As well, quantum annealing may be implemented as a heuristic technique, where low-energy states with energy near that of the ground state may provide approximate solutions to the problem.

Superconducting Qubits

There is a type of solid state qubit which is based on circuits of superconducting materials. Superconducting material conducts without electrical resistance under certain conditions like below a critical temperature, a critical current, or a magnetic field strength, or for some materials above a certain pressure. There are two superconducting effects that underlie how superconducting qubits operate: flux quantization, and Josephson tunneling.

Flux is quantized when a loop of superconducting material, threaded by a magnetic flux, is cooled below its superconducting critical temperature while the field is switched off. The supercurrent continues in an effort to maintain the flux. The flux is quantized. Thus, superconductivity is not simply the absence of electrical resistance but rather a quantum mechanical effect. All the current in the loop is governed by a single wavefunction and for the wavefunction to be single valued at any point in the loop the flux is quantized.

Josephson tunneling is where the current tunnels through a minor interruption in the loop, such as an insulating gap of a few nanometers. The amount of current is sinusoidally dependent on the phase difference across the interruption. This sinusoidally dependency is a non-linearity that leads to anharmonicity in the energy levels of the system.

These superconducting effects present in different configurations to give rise to different types of superconducting qubits including flux, phase, charge, and charge-phase qubits. Charge-phase qubits are also known as hybrid qubits. These different types of qubits depend on the topology of the loops and the physical parameters of the parts of the loops, such as, inductance, capacitance, and persistent current.

Persistent Current

A superconducting flux qubit may comprise a loop of superconducting material (called a "qubit loop") that is interrupted by at least one Josephson junction. Since the qubit loop is superconducting, it effectively has no electrical resistance. Thus, electrical current traveling in the qubit loop may experience no dissipation. If an electrical current is coupled into the qubit loop by, for example, a magnetic flux signal, this current may continue to circulate around the qubit loop even when the signal source is removed. The current may persist indefinitely until it is interfered with in some way or until the qubit loop is no longer superconducting (due to, for example, heating the qubit loop above its critical temperature). For the purposes of this specification, the term "persistent current" is used to describe an electrical current circulating in superconducting loop interrupted by at least one Josephson junction. The sign and magnitude of a persistent current may be influenced by a variety of factors, including but not limited to a flux signal $\Phi_X$ coupled directly into the superconducting loop and a flux signal $\Phi_{CJJ}$ (or $\Phi_{co}$) coupled into a compound Josephson junction that interrupts the superconducting loop.

Quantum Processor

A quantum processor may take the form of a superconducting quantum processor. A superconducting quantum processor may include a number of qubits and associated local bias devices, for instance two or more superconducting qubits. A superconducting quantum processor may also employ coupling devices (i.e., "couplers") providing communicative coupling between qubits. A qubit and a coupler resemble each other but differ in physical parameters. One difference is the screening parameter, $\beta$. Consider an rf-SQUID, superconducting loop interrupted by a Josephson junction, $\beta$ is the ratio of the inductance of the Josephson junction to the geometrical inductance of the loop. A design with lower values of $\beta$, about 1, behaves more like a simple inductive loop, a monostable device. A design with higher values is more dominated by the Josephson junctions, and is more likely to have bistable behavior. The parameter, $\beta$ is defined a $2\pi L/c/\Phi_0$. That is, $\beta$ is proportional to the product of inductance and critical current. One can vary the inductance, for example, a qubit is normally larger than its associated coupler. The larger device has a larger inductance and thus the qubit is often a bistable device and a coupler monostable. Alternatively the critical current can be varied, or the product of the critical current and inductance can be varied. A qubit often will have more devices associated with it.

Further details and examples quantum processors that may be used in conjunction with the present systems and devices are described in, for example, U.S. Pat. Nos. 7,533,068; 8,008,942; 8,195,596; 8,190,548; and 8,421,053.

The types of problems that may be solved by any particular embodiment of a quantum processor, as well as the relative size and complexity of such problems, typically depend on many factors. Two such factors may include the number of qubits in the quantum processor and the connectivity (i.e., the availability of communicative couplings) between the qubits in the quantum processor. Throughout this specification, the term "connectivity" is used to describe the maximum number of possible communicative coupling paths that are physically available (e.g., whether active or not) to communicably couple between individual qubits in a quantum processor without the use of intervening qubits. For example, a qubit with a connectivity of three is capable of communicably coupling to up to three other qubits without any intervening qubits. In other words, there are communicative coupling paths available to three other qubits, although in any particular application all or less than all (e.g., zero, one, two, or three) of those communicative coupling paths may be employed. In a quantum processor employing coupling devices between qubits, this would mean a qubit having a connectivity of three is selectively communicably coupleable to each of three other qubits via a respective one of three coupling devices. Typically, the number of qubits in a quantum processor limits the size of problems that may be solved and the connectivity between the qubits in a quantum processor limits the complexity of the problems that may be solved.

Many prior art techniques for using adiabatic quantum computation and/or quantum annealing to solve computational problems involve finding ways to directly map/embed a representation of a problem to the quantum processor itself. For example, U.S. Patent Publication 2008-0052055 describes solving a protein folding problem by first casting the protein folding problem as an Ising spin glass problem and then embedding the Ising spin glass problem to a quantum processor, and U.S. Pat. No. 8,073,808 describes solving a computational problem (e.g., an image-matching problem) by first casting the problem as a quadratic unconstrained binary optimization ("QUBO") problem and then embedding the QUBO problem directly on a quantum processor. In both cases, a problem is solved by first casting the problem in a contrived formulation (e.g., Ising spin glass, QUBO, etc.) because that particular formulation maps directly to the particular embodiment of the quantum processor being employed. In other words, an intermediate formulation is used to re-cast the original problem into a form that accommodates the number of qubits and/or connectivity constraints in the particular quantum processor and then the intermediate formulation is embedded on the quantum processor. This "embedding" approach is motivated by limitations inherent in the architecture of the quantum processor being employed. For example, a quantum processor that employs only pair-wise interactions between qubits (i.e., a quantum processor employing coupling devices that provide communicative coupling between respective pairs of qubits but not, for example, between larger sets of qubits, such as three or more qubits) is intrinsically well-suited to solve problems having quadratic terms (e.g., QUBO problems) because quadratic terms in a problem map directly to pair-wise interactions between qubits in the quantum processor.

Qubit Chains

The approach of re-casting a problem in an intermediate formulation and then embedding the intermediate formulation to the quantum processor commonly employs qubit chains comprising multiple superconducting qubits coupled together to behave as a single logical qubit. Techniques for forming logical qubits as qubit chains are described in, for example, U.S. Pat. Nos. 7,984,012, 8,244,662, and 8,174,305. Each individual qubit within a chain of qubits may have individual qubit parameters such as tunneling amplitude and persistent current. The chain itself may have "effective" qubit parameters such as effective tunneling amplitude and effective persistent current, where the effective qubit parameters of the chain are influenced by the individual qubit parameters of the individual qubits that make up the chain. For example, the effective tunneling amplitude of a chain of qubits may be related to the sum of the individual tunneling amplitudes of the individual qubits that make up the chain. Similarly, each of the qubits that make up a chain may have an individual connectivity, while the complete chain may have an effective connectivity that is related to the sum of the individual connectivities of the individual qubits that make up the chain. A chain of qubits when represented as a logical qubit represents a single variable of a problem. A chain of qubits may not necessarily always be a logical qubit. Individual qubits in a chain of qubits may represent different variables or the individual qubits in the chain of qubits may together represent a single variable. When a chain of qubits collectively behaves as a single qubit thereby representing a single variable of a problem, the chain of qubit may also be referred to as a "logical qubit."

When embedding a problem in a quantum processor, a single variable of the problem may be mapped to a chain of individual qubits. Increasing the number of qubits in a qubit chain increases the effective connectivity of the variable that is mapped to that chain, and therefore facilitates long-range pair-wise coupling between variables. In practice, however, there are limitations to the number of qubits that can be coupled together to form a single logical qubit. The effective tunneling amplitude of a qubit chain with N superconducting qubits, where each individual qubit has a tunneling amplitude of $\Delta_i$ and the chain comprises a total of N−1 couplings $J_i$ between individual qubits i, in the perturbative regime of $\Delta \ll J$, is:

$$\Delta_{eff} \sim \frac{\prod_{i=1}^{N} \Delta_i}{\prod_{i=1}^{N-1} H_i} \quad (4)$$

If all $\Delta_i$ and $J_i$ are identical, then:

$$\Delta_{eff} \sim \Delta \left(\frac{\Delta}{J}\right)^N \quad (5)$$

which is exponentially dependent on N. This makes a longer qubit chain (i.e., a chain having a larger N value) have a very small effective tunneling amplitude for a large portion of the quantum annealing time, thereby making the qubits behave like classical bits with fixed orientations and impeding the quantum annealing process.

BRIEF SUMMARY

Increasing the length of a chain of qubits is desirable because such increases the effective connectivity of the qubit chain, allowing more complicated problems to be mapped to the quantum processor. Therefore, there is a need in the art for systems and/or methods of increasing the length of a qubit chain in a quantum processor without degrading the effective parameters (such as the effective tunneling amplitude) of the qubit chain.

Orthogonality of Qubit Parameters

The tunneling amplitude of a superconducting qubit can be adjusted by changing the barrier height of the superconducting qubit. However, adjusting the tunneling amplitude of a qubit by changing the barrier height affects the persistent current of the qubit which would change the programmable parameters (such as the spin denoted by h, and coupling denoted by J) assigned to the qubit in a given problem to be solved. In other words, the tunneling amplitude and the persistent current of an individual qubit are non-orthogonal qubit parameters. Therefore, adjusting the tunneling amplitude of a superconducting qubit in a chain of superconducting qubits not only changes the programmable parameters of that particular qubit, but also the programmable parameters of the other superconducting qubits in the qubit chain that are coupled to that qubit. This sets a limit to the number of qubits that can be coupled together to behave as a single logical qubit. Therefore, there is a need in the art for techniques for achieving orthogonal control of non-orthogonal qubit parameters so that for example, adjusting the tunneling amplitude of a superconducting qubit would not affect the persistent current of the superconducting qubit and as a result multiple qubits can be coupled together to form longer chains or sets of superconducting qubits to increase the effective connectivity of the quantum processor.

A method of controlling qubit parameters in a quantum processor, wherein the quantum processor includes a plurality of qubits, each qubit having a respective first programmable parameter and a respective second programmable parameter that at least partially depends on the respective first programmable parameter, and a plurality of coupling devices that each selectively provide communicative coupling between respective pairs of the qubits may be summarized as including communicatively coupling at least three of the qubits to one another as a single logical qubit, the single logical qubit formed by a first outermost qubit, a second outermost qubit and at least one intermediary qubit, the at least one intermediary qubit strongly communicatively coupled between the first and the second outermost qubits, the first outmost qubit being an outermost qubit of the qubits of the logical qubit in a first direction along a logical qubit path defined by the qubits of the logical qubit and the second outermost qubit being an outermost qubit in a second direction along the logical qubit path; programming the first and the second outermost qubits to have respective first programmable parameters less than or equal to a first value; and programming the at least one of the intermediate qubits to have at least approximately near zero spin and to have respective values of the first programmable parameter higher than the first value. Communicatively coupling at least three of the qubits to one another as a single logical qubit may include communicatively coupling at least two qubits as respective intermediate qubits communicatively coupled between the first and the second outermost qubits; and programming the at least one intermediate qubit to have at least approximately near zero spin and to have respective values of the first programmable parameter higher than the first value includes programming all of the intermediate qubits to have at least approximately near zero spin and to have respective values of the first programmable parameter higher than the first value. The first programmable parameter may be tunneling amplitude, and programming the first programmable parameter of the first and the second outermost qubits may include programming a respective tunneling amplitude of the first and the second outermost qubits via a programming subsystem. The second programmable parameter may be a persistent current of the second qubit, and programming the tunneling amplitude of the at least one of the intermediate qubits may include programming a respective tunneling amplitude of the at least one of the intermediate qubits via the programming subsystem without substantially affecting the persistent current of the first and the second outermost qubits.

A quantum processor apparatus may be summarized as including a plurality of qubits, each qubit having a respective first programmable parameter and a respective second programmable parameter that at least partially depends on the respective first programmable parameter, and a plurality of coupling devices that each selectively provide communicative coupling between respective pairs of the qubits, wherein: at least three of the qubits are communicatively coupled to one another as a single logical qubit, the single logical qubit formed by a first outermost qubit, a second outermost qubit and at least one intermediary qubit, the at least one intermediary qubit strongly communicatively coupled between the first and the second outermost qubits, the first outmost qubit being an outermost qubit of the qubits of the logical qubit in a first direction along a logical qubit path defined by the qubits of the logical qubit and the second outermost qubit being an outermost qubit in a second direction along the logical qubit path; the first and the second outermost qubits have respective first programmable parameters less than or equal to a first value; and the at least one of the intermediate qubits to have at least approximately near zero spin and to have respective values of the first programmable parameter higher than the first value. The single logical qubit may include at least two qubits as respective intermediate qubits communicatively coupled between the first and the second outermost qubits, and all of the intermediate qubits to have at least approximately near zero spin and to have respective values of the first programmable parameter higher than the first value. The first programmable parameter may be tunneling amplitude, and a respective tunneling amplitude of the first and the second outermost qubits may be less than or equal to the first value. The second programmable parameter may be a persistent current of the second qubit, and a respective tunneling amplitude of the at least one of the intermediate qubits may not substantially affect the persistent current of the first and the second outermost qubits.

The quantum processor may further include at least one first programming subsystem communicatively coupleable to a compound Josephson junction of at least one of the qubits and operable to program a tunneling amplitude of the at least one of the qubits; and at least one second programming subsystem communicatively coupleable to a qubit loop of at least one of the qubits and operable to program a persistent current of the at least one of the qubits.

A method of controlling qubit parameters in a quantum processor, wherein the quantum processor includes a plurality of qubits, each qubit having a respective first programmable parameter and a respective second programmable parameter that at least partially depends on the respective first programmable parameter, and a plurality of coupling devices that each selectively provide communicative coupling between respective pairs of the qubits may be summarized as including communicatively coupling at least three of the qubits to one another as a single logical qubit, the single logical qubit formed by a first outermost qubit, a second outermost qubit and at least one intermediary qubit, the at least one intermediary qubit strongly communicatively coupled between the first and the second outermost qubits, the first outmost qubit being an outermost qubit of the qubits of the logical qubit in a first direction along a logical qubit path defined by the qubits of the logical qubit and the second outermost qubit being an outermost qubit in a second direction along the logical qubit path; for at least one of the at least one intermediate qubits of the logical qubit, communicatively coupling an orthogonal control qubit to the respective intermediate qubit such that the orthogonal control qubit is not communicatively coupled to any other qubit except via the respective intermediate qubit; programming the first and the second outermost qubits to have respective first programmable parameters less than or equal to a first value; and programming the orthogonal control qubit to have a value of the first programmable parameter higher than the first value. Communicatively coupling at least three of the qubits to one another as a single logical qubit may include communicatively coupling at least two qubits as respective intermediate qubits communicatively coupled between the first and the second outermost qubits; communicatively coupling a respective orthogonal control qubit to each of the respective intermediate qubits. Communicatively coupling at least three of the qubits to one another as a single logical qubit may include communicatively coupling at least two qubits as respective intermediate qubits communicatively coupled between the first and the second outermost qubits; for at least one of the at least one intermediate qubits of the logical qubit, communicatively coupling an orthogonal control qubit to the respective intermediate qubit includes for each of the at least two intermediate qubits, communicatively coupling a respective orthogonal control qubit to the respective intermediate qubit; and programming at least some of the intermediate qubits to have respective values of the first programmable parameter higher than the first value. Communicatively coupling an orthogonal control qubit to the respective intermediate qubit may include communicatively coupling the respective orthogonal control qubit directly to the respective intermediate qubit. Communicatively coupling an orthogonal control qubit to the respective intermediate qubit may include communicatively coupling the respective orthogonal control qubit directly via a respective one of the couplers to the respective intermediate qubit. Communicatively coupling an orthogonal control qubit to the respective intermediate qubit may include communicatively coupling the respective orthogonal control qubit which is smaller in area than the respective intermediate qubit to the respective intermediate qubit. The first programmable parameter may be tunneling amplitude, and programming the first programmable parameter of the first and the second outermost qubits may include programming a respective tunneling amplitude of the first and the second outermost qubits via the programming subsystem. The second programmable parameter may be a persistent current of the second qubit, and programming the tunneling amplitude of the orthogonal control qubit may include programming a respective tunneling amplitude of the orthogonal control qubit via the programming subsystem without substantially affecting the persistent current of the first and the second outermost qubits.

A quantum processor apparatus may be summarized as including a plurality of qubits, each qubit having a respective first programmable parameter and a respective second programmable parameter that at least partially depends on the respective first programmable parameter, and a plurality of coupling devices that each selectively provide communicative coupling between respective pairs of the qubits, wherein: at least three of the qubits are communicatively coupled to one another as a single logical qubit, the single logical qubit formed by a first outermost qubit, a second outermost qubit and at least one intermediary qubit, the at least one intermediary qubit strongly communicatively coupled between the first and the second outermost qubits, the first outmost qubit being an outermost qubit of the qubits of the logical qubit in a first direction along a logical qubit path defined by the qubits of the logical qubit and the second outermost qubit being an outermost qubit in a second direction along the logical qubit path; for at least one of the at least one intermediate qubits of the logical qubit, at least one of the qubits communicatively coupled as an orthogonal control qubit to the respective intermediate qubit such that the orthogonal control qubit is not communicatively coupled to any other qubit except via the respective intermediate qubit; the first and the second outermost qubits each have a respective first programmable parameters less than or equal to a first value; and the orthogonal control qubit has a value of the first programmable parameter higher than the first value. The single logical qubit may include at least two qubits communicatively coupled between the first and the second outermost qubits as respective intermediate qubits, and a respective orthogonal control qubit communicatively coupling to each of the respective intermediate qubits. The single logical qubit may include at least two qubits communicatively coupled between the first and the second outermost qubits as respective intermediate qubits, and for each of the intermediate qubits, a respective orthogonal control qubit communicatively coupled to the respective intermediate qubit; and at least some of the intermediate qubits having respective values of the first programmable parameter higher than the first value. The respective orthogonal control qubit may be communicatively coupled directly to the respective intermediate qubit. The respective orthogonal control qubit may be directly via a respective one of the couplers to the respective intermediate qubit. The respective orthogonal control qubit may be smaller in area than the respective intermediate qubit to the respective intermediate qubit. The first programmable parameter may be tunneling amplitude, and a respective tunneling amplitude of the first and the second outermost qubits may be less than or equal to a first value. The second programmable parameter may be a persistent current of the second qubit, and a respective tunneling amplitude of the orthogonal control qubit may not substantially affect the persistent current of the first and the second outermost qubits.

The quantum processor apparatus may further include at least one first programming subsystem communicatively coupleable to a compound Josephson junction of at least one of the qubits and operable to program a tunneling amplitude of the at least one of the qubits; and at least one second programming subsystem communicatively coupleable to a qubit loop of at least one of the qubits and operable to program a persistent current of the at least one of the qubits.

A method of controlling qubit parameters in a quantum processor, wherein the quantum processor includes a plurality of qubits, each qubit having a respective first programmable parameter and a respective second programmable parameter that at least partially depends on the respective first programmable parameter, and a plurality of coupling devices that each selectively provide communicative coupling between respective pairs of the qubits may be summarized as including for at least a first qubit, communicatively coupling an orthogonal control qubit to the first qubit such that the orthogonal control qubit is not communicatively coupled to any other qubit except via the first qubit; for at least the first qubit, communicatively coupling the first qubit to at least a second qubit which is not the orthogonal control qubit; programming the first qubits to have respective first programmable parameters less than or equal to a first value; and programming the orthogonal control qubit to have a respective value of the first programmable parameter higher than the first value. Communicatively coupling an orthogonal control qubit to the first qubit may include communicatively coupling the orthogonal control qubit directly to the first qubit. Communicatively coupling an orthogonal control qubit to the first qubit may include communicatively coupling the orthogonal control qubit directly via a respective one of the couplers to the first qubit. Communicatively coupling an orthogonal control qubit to the first qubit may include communicatively coupling the orthogonal control qubit which is smaller in area than the first qubit to the first qubit. The first programmable parameter may be tunneling amplitude, and programming the first programmable parameter of the first qubit may include programming a respective tunneling amplitude of the first qubit via the programming subsystem. The second programmable parameter may be a persistent current of the second qubit, and programming the tunneling amplitude of the orthogonal control qubit may include programming a respective tunneling amplitude of the orthogonal control qubit via the programming subsystem without substantially affecting the persistent current of the first qubit.

A quantum processor apparatus may be summarized as including a plurality of qubits, each qubit having a respective first programmable parameter and a respective second programmable parameter that at least partially depends on the respective first programmable parameter, and a plurality of coupling devices that each selectively provide communicative coupling between respective pairs of the qubits, wherein: at least one of the qubits is communicatively coupled as an orthogonal control qubit to a first qubit such that the orthogonal control qubit is not communicatively coupled to any other qubit except via the first qubit; the first qubit is communicatively coupled to at least a second qubit which is not the orthogonal control qubit; the first qubit has a respective first programmable parameter less than or equal to a first value; and the orthogonal control qubit has a respective value of the first programmable parameter higher than the first value. The orthogonal control qubit may be communicatively coupled directly to the first qubit. The orthogonal control qubit may be communicatively coupled directly via a respective one of the couplers to the first qubit. The orthogonal control qubit may be smaller in area than the first qubit to the first qubit. The first programmable parameter may be tunneling amplitude, and a respective tunneling amplitude of the first qubit may be less than or equal to a first value. The second programmable parameter may be a persistent current of the second qubit, and a respective tunneling amplitude of the orthogonal control qubit may not substantially affect the persistent current of the first qubit.

The quantum processor apparatus may further include at least one first programming subsystem communicatively coupleable to a compound Josephson junction of at least one of the qubits and operable to program a tunneling amplitude of the at least one of the qubits; and at least one second programming subsystem communicatively coupleable to a qubit loop of at least one of the qubits and operable to program a persistent current of the at least one of the qubits.

A method of controlling qubit parameters in a quantum processor, wherein the quantum processor includes a plurality of qubits, each qubit having a respective first programmable parameter and a respective second programmable parameter that at least partially depends on the respective first programmable parameter, and a plurality of coupling devices that each provide communicative coupling between respective sets of at least two qubits from the plurality of qubits may be summarized as including communicatively coupling a first qubit from the plurality of qubits and a second qubit from the plurality of qubits via a first coupling device from the plurality of coupling devices such that the first qubit, the second qubit, and the first coupling device collectively behave as a first logical qubit having an effective first programmable parameter that at least partially depends on the first programmable parameter of the first qubit and the first programmable parameter of the second qubit and an effective second programmable parameter that at least partially depends on the second programmable parameter of the first qubit and the second programmable parameter of the second qubit; and programming the effective first programmable parameter of the first logical qubit via a programming subsystem, wherein programming the effective first programmable parameter of the first logical qubit includes programming the first programmable parameter of the first qubit via the programming subsystem, wherein the first programmable parameter of the first qubit is independent of the second programmable parameter of the second qubit such that programming the first programmable parameter of the first qubit does not substantially affect the second programmable parameter of the second qubit.

The method may further include communicatively coupling a third qubit from the plurality of qubits and either the first qubit from the plurality of qubits or the second qubit from the plurality of qubits via a second coupling device from the plurality of coupling devices such that the first qubit, the second qubit, the third qubit, the first coupling device, and the second coupling device collectively behave as the first logical qubit, wherein the effective first programmable parameter of the first logical qubit at least partially depends on the first programmable parameter of the third qubit and the effective second programmable parameter of the first logical qubit at least partially depends on the second programmable parameter of the third qubit. The first programmable parameter of the first qubit via the programming subsystem may include programming a tunneling amplitude of the first qubit via the programming subsystem. The second programmable parameter of the second qubit a persistent current of the second qubit, and programming the tunneling amplitude of the first qubit via the programming subsystem may include programming the tunneling amplitude of the first qubit via the programming subsystem without substantially affecting the persistent current of the second qubit. Programming the effective first programmable parameter of the first logical qubit via the programming subsystem may include programming an effective tunneling amplitude of the first logical qubit via the programming subsystem. The effective first programmable parameter of the first logical qubit via the programming subsystem may include programming the first programmable parameter of the second qubit via the programming subsystem, and the first programmable parameter of the second qubit may be independent of the second programmable parameter of the first qubit such that programming the first programmable parameter of the second qubit via the programming subsystem does not substantially affect the second programmable parameter of the first qubit. The first programmable parameter of the second qubit via the programming subsystem may include programming a tunneling amplitude of the second qubit via the programming subsystem.

The method may further include programming the effective second programmable parameter of the first logical qubit via the programming subsystem, wherein programming the effective second programmable parameter of the first logical qubit includes programming the second programmable parameter of the first qubit via the programming subsystem, wherein the second programmable parameter of the first qubit is independent of the first programmable parameter of the second qubit such that programming the second programmable parameter of the first qubit does not substantially affect the first programmable parameter of the second qubit.

The method may further include programming the effective second programmable parameter of the first logical qubit via the programming subsystem, wherein programming the effective second programmable parameter of the first logical qubit includes programming the second programmable parameter of the second qubit via the programming subsystem, and wherein programming the second programmable parameter of the second qubit does not substantially affect the first programmable parameter of the first qubit.

A quantum processor comprising a plurality of hybrid qubits may be summarized as including a respective first qubit comprising: a first qubit loop formed by a first closed superconducting current path; and a compound Josephson junction that interrupts the first qubit loop; a respective second qubit comprising: a second qubit loop formed by a second closed superconducting current path; a first Josephson junction that interrupts the second qubit loop; and a compound Josephson junction that interrupts the second qubit loop; a respective first programming subsystem communicatively coupleable to the compound Josephson junction of the respective first qubit; a respective second programming subsystem communicatively coupleable to the first qubit loop of the respective first qubit; and a respective third programming subsystem communicatively coupleable to the compound Josephson junction of the respective second qubit, wherein the second qubit loop of the respective second qubit is galvanically coupled to the first qubit loop of the respective first qubit such that a portion of the second superconducting current path includes a portion of the first superconducting current path and is shared between the first and second superconducting current paths and wherein the first Josephson junction that interrupts the second qubit loop interrupts the portion of the second superconducting current path that is shared between the first and second superconducting current paths.

Each respective second qubit may further include a second Josephson junction that interrupts the second qubit loop, and wherein the second Josephson junction that interrupts the second qubit loop interrupts a portion of the second superconducting current path that is not shared between the first and second superconducting current paths. Each respective first qubit may include a respective first programmable parameter that is controlled by the respective first programming subsystem communicatively coupleable to the compound Josephson junction of the respective first qubit and a respective second programmable parameter that is controlled by the respective second programming subsystem communicatively coupleable to the first qubit loop of the respective first qubit, and wherein, for each respective first qubit, the respective second programmable parameter at least partially depends on the respective first programmable parameter. Each respective second qubit may include a respective first programmable parameter that is controlled by the respective third programming subsystem communicatively coupleable to the compound Josephson junction of the respective second qubit, and wherein the respective second programmable parameter of each respective first qubit is independent of the respective first programmable parameter of the respective second qubit to which the respective first qubit is galvanically coupled, such that the respective first programmable parameter of each respective second qubit does not substantially affect the respective second programmable parameter of the respective first qubit to which the respective second qubit is galvanically coupled. For each respective first qubit, the respective first programmable parameter may be a respective tunneling amplitude of the respective first qubit and the respective second programmable parameter may be a respective persistent current in the first qubit loop of the respective first qubit, and, for each respective second qubit, the respective first programmable parameter may be a respective tunneling amplitude of the respective second qubit.

The quantum processor wherein each hybrid qubit may further include a respective effective first programmable parameter that at least partially depends on the respective first programmable parameter of the respective first qubit and the respective first programmable parameter of the respective second qubit; and a respective effective second programmable parameter that at least partially depends on the respective second programmable parameter of the respective first qubit, such that each hybrid qubit behaves as a respective logical qubit. For each respective hybrid qubit, the respective effective first programmable parameter may be an effective tunneling amplitude of the respective hybrid qubit and the respective effective second programmable parameter may be an effective persistent current of the respective hybrid qubit.

The quantum may further include a plurality of coupling devices, wherein each respective coupling device is communicatively coupleable to a respective first qubit in a respective first hybrid qubit and a respective first qubit in a respective second hybrid qubit such that each respective coupling device provides communicative coupling between a respective pair of hybrid qubits. Each respective coupling device may include a respective loop of superconducting material interrupted by at least one respective Josephson junction, and each respective coupling device maybe communicatively coupleable to a respective first qubit in a respective first hybrid qubit via galvanic or inductive coupling and to a respective first qubit in a respective second hybrid qubit via galvanic or inductive coupling. A first hybrid qubit and a second hybrid qubit may be communicatively coupleable via a first coupling device to behave as a first logical qubit including an effective first programmable parameter that depends on the first programmable parameter of the first qubit in the first hybrid qubit, the first programmable parameter of the second qubit in the first hybrid qubit, the first programmable parameter of the first qubit in the second hybrid qubit, and the first programmable parameter of the second qubit in the second hybrid qubit; and an effective second programmable parameter that depends on the second programmable parameter of the first qubit in the first hybrid qubit and the second programmable parameter of the first qubit in the second hybrid qubit, wherein the effective first programmable parameter of the first logical qubit is independent of the effective second programmable parameter of the first logical qubit such that the effective first programmable parameter of the first logical qubit does not substantially affect the effective second programmable parameter of the first logical qubit.

A method of achieving orthogonal control of at least two effective qubit parameters in a quantum processor comprising a plurality of hybrid qubits, wherein each hybrid qubit comprises a respective first qubit having a respective first programmable parameter and a respective second programmable parameter, and a respective second qubit having a respective first programmable parameter, the respective first qubit and the respective second qubit of each respective hybrid qubit being galvanically coupled may be summarized as including programming an effective first programmable parameter of a first hybrid qubit via a programming subsystem without substantially affecting an effective second programmable parameter of the first hybrid qubit, wherein the effective first programmable parameter of the first hybrid qubit depends on both the respective first programmable parameter of the respective first qubit of the first hybrid qubit and the respective first programmable parameter of the respective second qubit of the first hybrid qubit and the effective second programmable parameter of the first hybrid qubit depends on the respective second programmable parameter of the respective first qubit of the first hybrid qubit, and wherein programming the effective first programmable parameter of the first hybrid qubit includes programming the respective first programmable parameter of the respective second qubit of the first hybrid qubit via the programming subsystem, wherein the respective second programmable parameter of the respective first qubit of the first hybrid qubit is independent of the respective first programmable parameter of the respective second qubit of the first hybrid qubit such that programming the respective first programmable parameter of the respective second qubit of the first hybrid qubit does not substantially affect the respective second programmable parameter of the respective first qubit of the first hybrid qubit. Programming the effective first programmable parameter of the first hybrid qubit via the programming subsystem may include programming an effective tunneling amplitude of the first hybrid qubit, and programming the respective first programmable parameter of the respective second qubit of the first hybrid qubit via the programming subsystem may include programming a tunneling amplitude of the respective second qubit via the programming subsystem. The respective second programmable parameter of the respective first qubit of the first hybrid qubit may be a persistent current of the respective first qubit and wherein programming the tunneling amplitude of the respective second qubit may not substantially affect the persistent current of the respective first qubit.

The method may further include communicatively coupling a second hybrid qubit and the first hybrid qubit via a first coupling device such that the first hybrid qubit, the second hybrid qubit, and the first coupling device collectively behave as a single logical qubit, wherein the second hybrid qubit includes: an effective first programmable parameter that depends on both the respective first programmable parameter of the respective first qubit of the second hybrid qubit and the respective first programmable parameter of the respective second qubit of the second hybrid qubit; and an effective second programmable parameter that depends on the respective second programmable parameter of the respective first qubit of the second hybrid qubit, wherein the first logical qubit includes: an effective first programmable parameter that depends on both the effective first programmable parameter of the first hybrid qubit and the effective first programmable parameter of the second hybrid qubit; and an effective second programmable parameter that depends on both the effective second programmable parameter of the first hybrid qubit and the effective second programmable parameter of the second hybrid qubit.

The method may further include programming the effective first programmable parameter of the first logical qubit via the programming subsystem, wherein programming the effective first programmable parameter of the first logical qubit includes programming at least one of the effective first programmable parameter of the first hybrid qubit or the effective first programmable parameter of the second hybrid qubit via the programming subsystem.

The method may further include programming the effective second programmable parameter of the first logical qubit via the programming subsystem, wherein programming the effective second programmable parameter of the first logical qubit includes programming at least one of the effective second programmable parameter of the first hybrid qubit or the effective second programmable parameter of the second hybrid qubit via the programming subsystem.

A method of achieving orthogonal control of at least two qubit parameters in a quantum processor may be summarized as including communicatively coupling a first qubit and a second qubit such that the first qubit and the second qubit together behave as a single logical qubit, wherein the first qubit includes a first programmable parameter and a second programmable parameter, the second programmable parameter of the first qubit at least partially dependent on the first programmable parameter of the first qubit, and wherein the second qubit includes at least a first programmable parameter, the second programmable parameter of the first qubit substantially independent of the first programmable parameter of the second qubit; and programming an effective first programmable parameter of the logical qubit via a programming subsystem without substantially affecting an effective second programmable parameter of the logical qubit, wherein the effective first programmable parameter of the logical qubit at least partially depends on the first programmable parameter of the first qubit and the first programmable parameter of the second qubit and the effective second programmable parameter of the logical qubit at least partially depends on the second programmable parameter of the first qubit, and wherein programming the effective first programmable parameter of the logical qubit via the programming subsystem includes programming the first programmable parameter of the second qubit via the programming subsystem without substantially affecting the second programmable parameter of the first qubit.

The method may further include programming the effective second programmable parameter of the logical qubit via the programming subsystem, wherein programming the effective second programmable parameter of the logical qubit includes programming the second programmable parameter of the first qubit via the programming subsystem. The first qubit may include a first qubit loop formed by a first closed superconducting current path and a first compound Josephson junction that interrupts the first qubit loop; the second qubit may include a second qubit loop formed by a second closed superconducting current path and a second compound Josephson junction that interrupts the second qubit loop; and communicatively coupling the first qubit and the second qubit such that the first qubit and the second qubit together behave as a single logical qubit may include communicatively coupling the first qubit and the second qubit via a coupling device such that the first qubit, the second qubit, and the coupling device collectively behave as a single logical qubit. Coupling the first qubit and the second qubit via a coupling device such that the first qubit, the second qubit, and the coupling device collectively behave as a single logical qubit may include inductively coupling the first qubit and the coupling device and inductively coupling the second qubit and the coupling device. The first qubit may include a first qubit loop formed by a first closed superconducting current path and a first compound Josephson junction that interrupts the first qubit loop; the second qubit may include a second qubit loop formed by a second closed superconducting current path, a first Josephson junction that interrupts the second qubit loop, and a second compound Josephson junction that interrupts the second qubit loop; and communicatively coupling the first qubit and the second qubit such that the first qubit and the second qubit together behave as a single logical qubit may include galvanically coupling the first qubit loop of the first qubit and the second qubit loop of the second qubit such that a portion of the second superconducting current path includes a portion of the first superconducting current path and is shared between the first and second superconducting current paths, and such that the first Josephson junction that interrupts that second qubit loop interrupts the portion of the second superconducting current path that is shared between the first and second superconducting current paths. The method wherein the second qubit may further include a second Josephson junction that interrupts the second qubit loop; and communicatively coupling the first qubit and the second qubit such that the first qubit and the second qubit together behave as a single logical qubit may include galvanically coupling the first qubit loop of the first qubit and the second qubit loop of the second qubit such that the second Josephson junction that interrupts the second qubit loop interrupts a portion of the second superconducting current path that is not shared between the first and second superconducting current paths. The effective first programmable parameter of the logical qubit via the programming subsystem may include programming an effective tunneling amplitude of the logical qubit, and programming the first programmable parameter of the second qubit via the programming subsystem may include programming a tunneling amplitude of the second qubit via the programming subsystem.

The second programmable parameter of the first qubit may be a persistent current of the first qubit, and wherein programming the tunneling amplitude of the second qubit via the programming subsystem may not substantially affect the persistent current of the first qubit.

BRIEF DESCRIPTION OF THE SEVERAL VIEWS OF THE DRAWING(S)

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn are not intended to convey any information regarding the actual shape of the particular elements, and have been solely selected for ease of recognition in the drawings.

DETAILED DESCRIPTION

Figure 1:
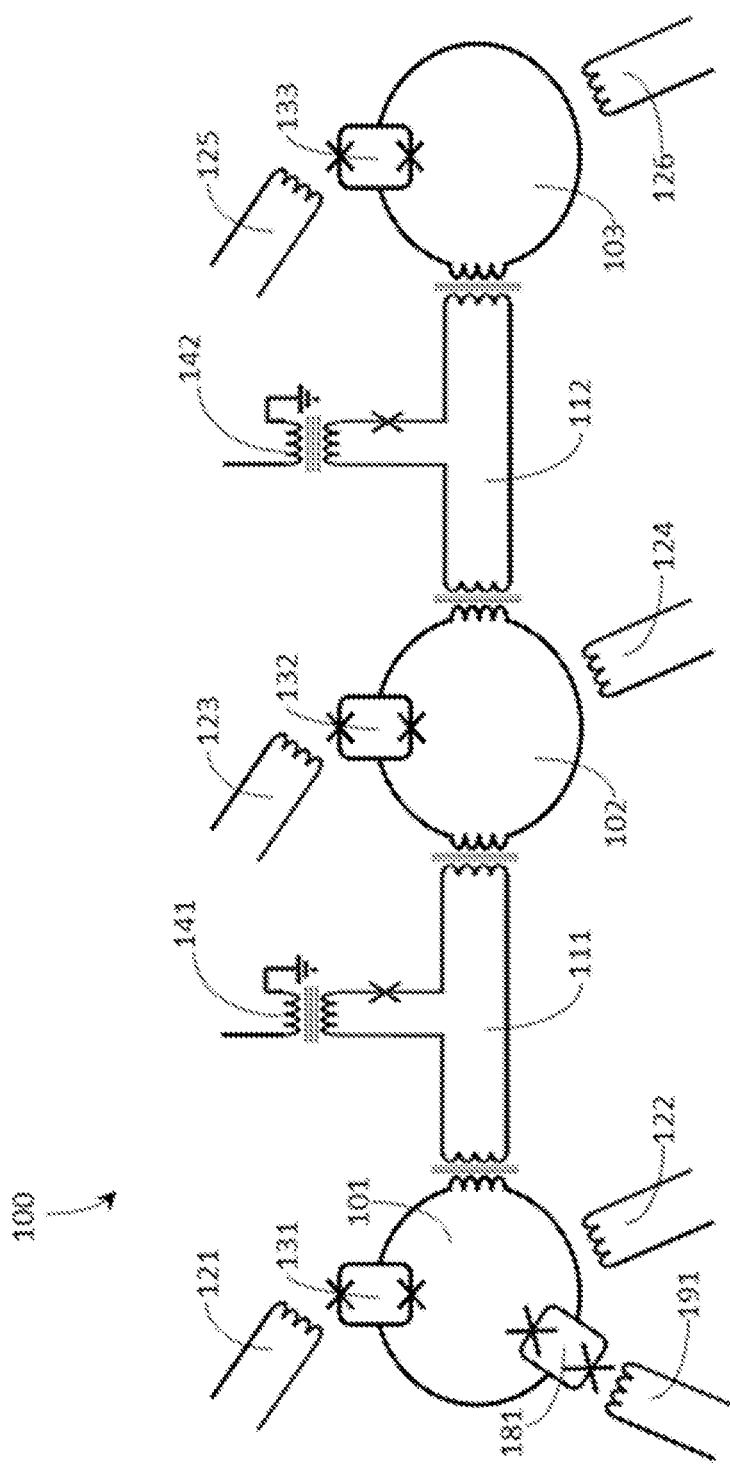
FIG. 1 is a schematic diagram of an exemplary logical qubit from a portion of a superconducting quantum processor in accordance with the present systems and methods.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with quantum processors, qubits, couplers, controller, readout devices and/or interfaces have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one example", "an example", "one embodiment" or "an embodiment" means that a particular feature, structure or characteristic described in connection with the embodiment is included in at least one embodiment. Thus, the appearances of the phrases "in one example", "in an example", "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the embodiments.

Qubit chains may be used in quantum processors to embed problems into the quantum hardware. Increasing the length of a qubit chain increases the effective connectivity of the qubit graph (at the cost of reducing the number of effective qubits in the graph) which facilitates embedding of problems into the quantum processor. It is typically difficult to build chains or sets longer (i.e., total number of qubits) than about four qubits as the effective tunneling amplitude decreases exponentially as the size of the chain grows (see, for example, Equation 5). However, in accordance with the present systems and methods, the exponential reduction of the effective tunneling amplitude as the number of qubits in a chain grows can be avoided programmatically by applying specific configurations of individual qubit parameter signals. For example, according to Equation 5, if all qubits in a chain except for one have $\Delta_i \sim J_i$ and only one of the qubits has $\Delta_i = \Delta$, then the effective tunneling amplitude $\Delta_{\mathit{eff}} \sim \Delta$, which is no longer exponentially dependent on the number of qubits in the chain.

Therefore, longer chains of qubits with a stable effective tunneling amplitude can be achieved by using larger individual tunneling amplitudes ($\Delta_i \sim J_i$) for the qubits that are inside the chain of qubits (i.e., "inner qubits" that are not actively coupled to any qubits outside of the chain) and lower individual tunneling amplitudes ($\Delta_i = \Delta$) for the qubits that are coupled to qubits that are outside of the chain (e.g., qubits that are at the ends of the chain, and/or any qubit(s) in the middle of the chain that are actively coupled to a qubit or qubits that are not part of the chain). This way the effective tunneling amplitude of all logical qubits, including those represented by chains of qubits, will be stabilized, leading to better performance.

Adjusting the individual tunneling amplitude of a qubit may change the persistent current of the qubit which may then change the programmable parameters (such as h and J) of the qubit. This unintentional change of the programmable parameters of a superconducting qubit arises because the persistent current and the tunneling amplitude of a superconducting qubit are non-orthogonal parameters and results in the quantum processor solving erroneous problems. Of the various embodiments described herein provide systems and methods for achieving orthogonal control of non-orthogonal qubit parameters by, for example, introducing a second qubit communicatively coupled to a first qubit so that the pair of communicatively coupled qubits may behave as a single logical qubit. If each of the qubits in the logical qubit has a tunneling amplitude $\Delta_i$ and the coupling between the pair of qubits is J, the effective tunneling amplitude of the logical qubit in the perturbative regime of $\Delta \ll J$ is:

$$\Delta_{\textit{eff}} \sim \frac{\Delta_1 \Delta_2}{J} \tag{3}$$

Therefore, by adjusting the tunneling amplitude of one qubit, the effective tunneling amplitude of the logical qubit can be adjusted. For example, tuning the tunneling amplitude of the second qubit will adjust the effective tunneling amplitude of the logical qubit without affecting the persistent current of the first qubit. Orthogonal control of non-orthogonal qubit parameters can therefore be achieved by communicatively coupling a second qubit to a first qubit to form a single logical qubit, where a first effective parameter of the logical qubit is adjusted by adjusting a first parameter of the first qubit and a first parameter of the second qubit and a second effective parameter of the logical qubit is adjusted by adjusting a second parameter of the first qubit, and where the first parameter of the first qubit and the second parameter of the second qubit do not influence one another. Longer chains of qubits can therefore be achieved by forming chains of such logical qubit pairs.

Throughout this specification and the appended claims, the term "logical qubit" is used to describe a collection/chain of communicatively coupled qubits that act as a single qubit. In other words, a chain of communicatively coupled qubits that may collectively represent a single variable of a problem may be referred to as a logical qubit. Therefore, a logical qubit may comprise more than one qubit. However, a chain of communicatively coupled qubits may not always be a logical qubit as the individual qubits in the chain of qubits may represent different variables of a problem. When a chain of qubits are programmed to represent a single variable such that the chain of qubits collectively act as a single qubit, that chain of qubits may then be called a logical qubit. According to the present systems and methods, a logical qubit may at least be formed by communicatively coupling a first qubit to a second qubit such that the first qubit and the second qubit collectively behave as one qubit.

The various embodiments described herein provide systems and methods for achieving orthogonal control of non-orthogonal qubit parameters and thereby increase the number of qubits that can be communicatively coupled to behave as a single logical qubit. As an illustrative example, a superconducting quantum processor designed to perform adiabatic quantum computation and/or quantum annealing is used in the description that follows. However, a person of skill in the art will appreciate that the present systems and methods may be applied to any form of quantum processor hardware implementing any form of quantum algorithm(s) (e.g., adiabatic quantum computation, quantum annealing, gate/circuit-based quantum computing, etc.).

An evolution Hamiltonian is proportional to the sum of a first term proportional to the problem Hamiltonian and a second term proportional to the disordering Hamiltonian. As previously discussed, a typical evolution may be represented by Equation 7:

$$H_E \propto A(t)H_D + B(t)H_P \tag{7}$$

where $H_P$ is the problem Hamiltonian, disordering Hamiltonian is $H_D$, $H_E$ is the evolution or instantaneous Hamiltonian, and A(t) and B(t) are examples of an evolution coefficient which controls the rate of evolution. In general, evolution coefficients vary from 0 to 1. In some embodiments, a time varying envelope function is placed on the problem Hamiltonian. A common disordering Hamiltonian is shown in Equation 8:

$$H_D \propto -\frac{1}{2}\sum_{i=1}^{N} \Delta_i \sigma_i^x \tag{8}$$

where N represents the number of qubits, $\sigma_i^x$ is the Pauli x-matrix for the $i^{th}$ qubit and $\Delta_i$ is the single qubit tunnel splitting induced in the $i^{th}$ qubit. Here, the $\sigma_i^x$ terms are examples of "off-diagonal" terms. A common problem Hamiltonian includes first component proportional to diagonal single qubit terms and a second component proportional to diagonal multi-qubit terms. The problem Hamiltonian, for example, may be of the form:

$$H_P \propto -\frac{\varepsilon}{2}\left[\sum_{i=1}^{N} h_i \sigma_i^z + \sum_{j>i}^{N} J_{ij}\sigma_i^z \sigma_j^z\right] \tag{9}$$

where N represents the number of qubits, $\sigma_i^z$ is the Pauli z-matrix for the $i^{th}$ qubit, $h_i$ and $J_{i,j}$ are dimensionless local fields for the qubits, and couplings between qubits, and $\varepsilon$ is some characteristic energy scale for $H_P$. Here, the $\sigma_i^z$ and $\sigma_i^z\sigma_j^z$ terms are examples of "diagonal" terms. The former is a single qubit term and the latter a two qubit term. Throughout this specification, the terms "problem Hamiltonian" and "final Hamiltonian" are used interchangeably. Hamiltonians such as $H_D$ and $H_P$ in Equations 8 and 9, respectively, may be physically realized in a variety of different ways. A particular example is realized by an implementation of superconducting qubits.

FIG. 1 shows an exemplary logical qubit 100 from a portion of a superconducting quantum processor in accordance with the present systems and methods. Logical qubit 100 comprises three superconducting flux qubits 101, 102, 103 and two tunable ZZ-couplers 111, 112 coupling information therebetween. While logical qubit 100 shown in FIG. 1 includes three qubits 101, 102, 103 and two couplers 111, 112 those of skill in the art will appreciate that logical qubit 100 may include any number of qubits, and any number of coupling devices coupling information therebetween (for example, 2 qubits and 1 coupling device, 5 qubits and 4 coupling devices, etc.).

Each qubit 101, 102, 103 of logical qubit 100 has a respective first programmable parameter and a respective second programmable parameter. The respective first programmable parameter of each qubit 101, 102, 103 may for example be a tunneling amplitude of each qubit 101, 102, 103 and the respective second programmable parameter of each qubit 101, 102, 103 may for example be a persistent current of each qubit 101, 102, 103. However, a person of skill in the art will appreciate that, in alternative embodiments, the first and second programmable parameters of a qubit may be any other programmable parameters of that qubit. Logical qubit 100 has an effective first programmable parameter and an effective second programmable parameter. The effective first programmable parameter of logical qubit 100 may depend on the respective first programmable parameters of qubits 101, 102 and 103. The effective second programmable parameter of logical qubit 100 may depend on the respective second programmable parameters of qubits 101, 102 and 103. The effective first programmable parameter of logical qubit 100 may, for example, be an effective tunneling amplitude of logical qubit 100 that is dependent on the respective tunneling amplitudes of qubits 101, 102, and 103, whereas the effective second programmable parameter of logical qubit 100 may, for example, be an effective persistent current of logical qubit 100 that is dependent on the respective persistent currents of qubits 101, 102, and 103.

However, a person of skill in the art will appreciate that in alternative embodiments the effective first and second programmable parameters of a logical qubit may be any other effective programmable parameters of the logical qubit which depends on the respective programmable parameters of the individual qubits that make up the logical qubit.

In order to adjust/maintain the effective tunneling amplitude of logical qubit 100, the respective tunneling amplitudes of qubits 101, 102 and 103 may be adjusted. The respective tunneling amplitudes of qubits 101, 102 and 103 may be adjusted by programming the barrier height of each qubit 101, 102 and 103 via respective programming subsystems 121, 123 and 125. The respective persistent currents of qubits 101, 102 and 103 may be adjusted by a respective magnetic flux coupled into the body of each respective qubit 101, 102 and 103 via a respective programming subsystem 122, 124 and 126. Programming subsystems 121-126 that are used to configure and control the programmable parameters of qubits 101, 102 and 103 may be realized by respective inductive coupling structures, as illustrated, connected to a programming system (not shown). In the operation of logical qubit 100, programming subsystems 121, 123 and 125 may each be used to couple a flux signal $\phi_{CJJ}$ into a respective compound Josephson junction 131, 132, 133 of qubits 101, 102 and 103, thereby realizing the $\Delta_i$ terms (i.e., tunneling amplitude) in the system Hamiltonian. This coupling provides the $\sigma^X$ terms of Equation 8. Similarly, programming subsystems 122, 124 and 126 may each be used to couple a flux signal $\phi_X$ into a respective qubit loop of qubits 101, 102 and 103, thereby realizing the $h_i$ terms in the system Hamiltonian. This coupling provides the $\sigma^z$ terms of Equation 9.

Programming subsystem 141 may be used to control the coupling between qubits 101 and 102 realized by coupling device 111 and programming subsystem 142 may be used to control the coupling between qubits 102 and 103 realized by coupling device 112.

The effective tunneling amplitude of logical qubit 100 may also be adjusted by adjusting the inductance L applied to at least one of qubits 101, 102, 103 via for example, an inductance-tuner (referred to hereinafter as an "L-tuner"). In other words, by adjusting the L-tuner settings of at least one of qubits 101, 102, 103 to achieve an essentially similar effect as coupling a flux signal $\phi_{CJJ}$ into a respective compound Josephson junction 131, 132, 133 of qubits 101, 102 and 103 as described above, the effective tunneling amplitude of logical qubit 100 may be adjusted. FIG. 1 shows an L-tuner compound Josephson junction structure 181 connected in series with qubit 101 to enable tuning of the qubit inductance. The Josephson inductance of L-tuner compound Josephson junction structure 181 of qubit 101 may be tuned using programming subsystem 191. Only L-tuner compound Josephson junction structure 181 and its corresponding programming subsystem 191 is shown in FIG. 1 to reduce clutter. L-tuners are described in detail in, for example, U.S. Patent Publication 2011-0057169.

As previously described, a plurality of qubits may be communicatively coupled via a plurality of coupling devices (e.g., pair-wise coupled to form a chain or sequence, series or linear set of qubit-to-qubit communicatively coupled qubits which define a communicative path) in order to form a logical qubit comprising a desired number of qubits and coupling devices. The longer the logical qubit (i.e., the greater the number of qubits in a logical qubit), the greater the number of other qubits communicatively coupleable with the logical qubit. In other words, increasing the number of qubits in a logical qubit increases the effective connectivity of the logical qubit. However, in practice, it is difficult to form logical qubits (or, in other words, chains of qubits where the qubits in a chain of qubits collectively represent a single variable) comprising more than four qubits. The exponential dependency between the effective tunneling amplitude of a logical qubit and the number of qubits in the logical qubit as given in Equation 5 lowers the effective tunneling amplitude of the logical qubit to a point at which the qubits in the logical qubit may transition from the quantum regime into the classical regime and behave as classical bits. In accordance with the present systems and methods, the decreasing effective tunneling amplitude of a logical qubit due to increasing the number of qubits in the logical qubit, for ferromagnetically coupled qubits, may be circumvented by programming a larger tunneling amplitude into the individual qubits that are inside the logical qubit (i.e., "inner qubits") than the tunneling amplitude of the individual qubits that are at the ends of the logical qubit. In other words, by applying a larger tunneling amplitude into the individual qubits comprised in the logical qubit that are inside the logical qubit (for example, qubit 102) than the tunneling amplitude of the outermost qubits of the logical qubit (for example, qubits 101 and 103), the otherwise decreasing effective tunneling amplitude of the logical qubit due to addition of qubits to the logical qubit may be avoided.

For example, in logical qubit 100, one may tune the individual tunneling amplitudes of qubits that have an h approximately equal to zero and that are not coupled to qubits that are outside the chain of qubits (i.e., that are not coupled to qubits that do not belong to logical qubit 100) unless otherwise a careful calibration is done. Tuning the tunneling amplitude of qubits that have a non-zero h value may alter the persistent current of the logical qubit, and tuning the tunneling amplitude of qubits that are actively coupled to at least one other qubit outside of the chain may alter the persistent current of the other qubits that are coupled to that qubit. Typically, adjusting the tunneling amplitude of a qubit changes the persistent current of the qubit which then changes the h and J of that qubit. However, if the h of an individual qubit in a logical qubit is approximately zero and the internal J of that qubit is large (i.e., strong coupling between the qubit and other qubits of the same logical qubit coupled to that qubit), changes in persistent current may only slightly affect the h and J of that qubit which gives the freedom to adjust the tunneling amplitude of that qubit. The inner qubits of a chain (for example, qubit 102 in FIG. 1) may be deliberately programmed to have approximately zero h. The tunneling amplitude of such inner qubits may be adjusted to have a tunneling amplitude that is higher than the tunneling amplitude of the other qubits in the chain, such that the effective tunneling amplitude of the logical qubit may be, for example, substantially matched to the individual tunneling amplitudes of qubits that are not part of the logical qubit despite the fact that the logical qubit comprises multiple qubits. In other words, the exponential decrease in the effective tunneling amplitude of a logical qubit (as per Equation 5) may be overcome by programming higher individual tunneling amplitudes into the inner qubits that make up the logical qubit. As a result, the logical qubit remains in the quantum regime during the performance of quantum computations. In other words, by adjusting the tunneling amplitude of some selected qubits in a logical qubit, a uniform effective tunneling amplitude of the logical qubit may be achieved.

Figure 2:
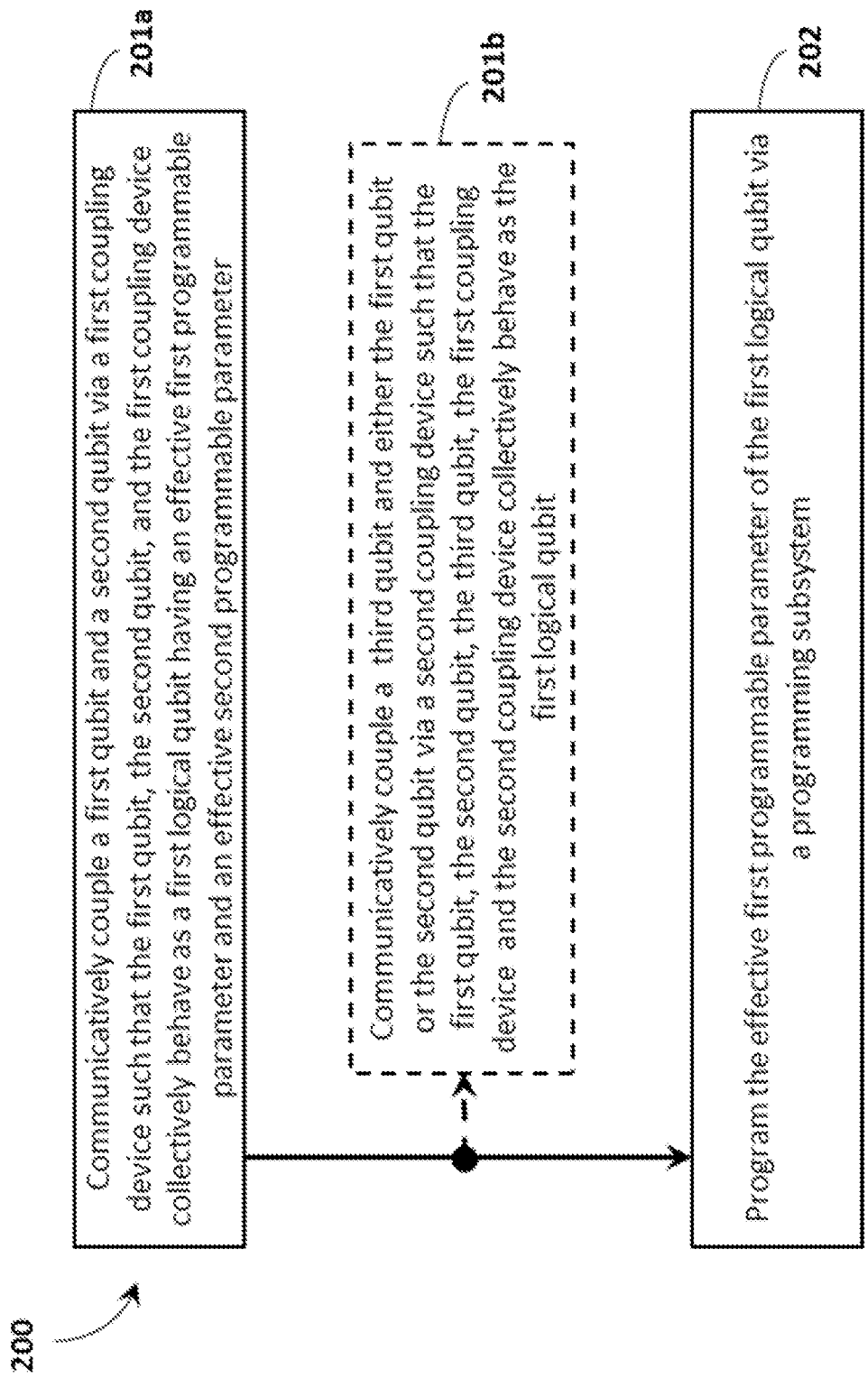
FIG. 2 is a flow-diagram of a method for controlling qubit parameters in a quantum processor that includes a plurality of qubits, in accordance with the present systems and methods.

FIG. 2 shows a method 200 for controlling qubit parameters in a quantum processor that includes a plurality of qubits, in accordance with the present systems and methods. Each qubit in the plurality of qubits comprises a respective tunneling amplitude and a respective persistent current. The quantum processor also includes a plurality of coupling devices used to communicatively couple pairs of qubits together. Method 200 includes two acts 201a and 202 and an optional act 201b, though those of skill in the art will appreciate that in alternative embodiments certain acts may be omitted and/or additional acts may be added. Those of skill in the art will appreciate that the illustrated order of the acts is shown for exemplary purposes only and may change in alternative embodiments.

At 201a, a first qubit and a second qubit are communicatively coupled together via a first coupling device so that the first qubit, the second qubit and the first coupling device collectively behave as a first logical qubit having an effective first programmable parameter and an effective second programmable parameter. As previously described, the first and second effective programmable parameters of the first logical qubit may be an effective tunneling amplitude and an effective persistent current of the logical qubit, respectively. The first qubit and the second qubit are communicatively coupled together via a first coupling device as illustrated in FIG. 1. For example, qubit 101 and 102 of FIG. 1 are communicatively coupled together via coupling device 111 as described in act 201a. Communicatively coupling the first and the second qubit may include ferromagnetically, antiferromagnetically and/or transversely coupling the first and the second qubit.

At 202, the effective first programmable parameter of the first logical qubit of step 201a is programmed via a programming subsystem. Each qubit (for example, the first qubit and the second qubit) may comprise a respective first programmable parameter and a respective second programmable parameter. The effective first programmable parameter of the logical qubit may be programmed by programming the first programmable parameter of the first qubit, the first programmable parameter of the second qubit, or the respective first programmable parameters of both the first and second qubits via the programming subsystem (for example, programming subsystem 121 of FIG. 1). The effective first programmable parameter of the logical qubit may be an effective tunneling amplitude of the logical qubit, the first programmable parameter of the first qubit may be a tunneling amplitude of the first qubit, and the first programmable parameter of the second qubit may be a tunneling amplitude of the second qubit. The effective second programmable parameter of the logical qubit may be an effective persistent current of the logical qubit, the second programmable parameter of the first qubit may be a persistent current of the first qubit, and the second programmable parameter of the second qubit may be a persistent current of the second qubit.

At 201b, a third qubit is communicatively coupled to the first qubit or the second qubit of act 201a via a second coupling device so that the first qubit, the second qubit, the third qubit, the first coupling device and the second coupling device may collectively behave as the first logical qubit of step 201a. For example, FIG. 1 shows qubit 103 communicatively coupled to qubit 102 via coupling device 112 such that qubits 101, 102, 103 and coupling devices 111, 112 may collectively behave as logical qubit 100. Similar to act 202 and FIG. 1, a plurality of qubits may be communicatively coupled via a plurality of coupling devices in order to form a logical qubit comprising a desired number of qubits and coupling devices. Therefore, act 201b is an optional act that may be carried out to form a logical qubit.

In order to maintain the effective tunneling amplitude of the logical qubit that may otherwise decrease due to the addition of qubits to form the logical qubit, the tunneling amplitudes of at least some of the individual qubits in the logical qubit may be adjusted. In other words, the tunneling amplitudes of at least some of the individual qubits in the logical qubit may be adjusted such that the effective tunneling amplitude of the logical qubit may be substantially similar to the effective tunneling amplitude of the logical qubit before the addition of additional qubits to form the logical qubit. Therefore, a target effective tunneling amplitude may be chosen to which the effective tunneling amplitude of the logical qubit may be synchronized prior to adjusting the tunneling amplitudes of the individual qubits in the logical qubit. As described in FIG. 1 above, tunneling amplitudes of "inner qubits" that are inside the chain of qubits (i.e., not at the ends of the chain, sequence, series or linear set of qubits, e.g., qubit 102 of logical qubit 100) and that have approximately zero h may be adjusted to modify the effective tunneling amplitude of the logical qubit. For example, increasing the tunneling amplitude of an inner qubit with an approximately zero h may compensate the decrease in the effective tunneling amplitude of the logical qubit that results from including that inner qubit in the chain, thereby maintaining the effective tunneling amplitude of the logical qubit in the quantum regime. Changing the tunneling amplitude of a qubit with an approximately zero h may not significantly affect the persistent current of that qubit, and therefore may not significantly affect the h and J parameters of that qubit. For this reason, it may be advantageous to adjust the tunneling amplitudes of qubits that are not actively coupled to qubits outside of the chain and that have an approximately zero h.

The tunneling amplitude of an inner qubit with a non-zero h may be adjusted with the addition of a second qubit strongly coupled to the inner qubit such that the change of tunneling amplitude of the second qubit may not affect the persistent current of the inner qubit and therefore may not affect the h and J values of the inner qubit. The second qubit may, for example, be only actively or operably communicatively coupleable directly (i.e., with no intervening qubits, whether via a coupler or not) to the inner qubit, and not directly coupled to any other qubit (i.e., the second qubit may have an "effective connectivity" of one). In this configuration, the combination of the inner qubit and the second qubit may be referred to as a single "hybrid" qubit. This hybrid qubit is not necessarily a charge-phase qubit where the Josephson and charging energies are comparable.

A hybrid qubit may also be a logical qubit. A hybrid qubit may comprise a first qubit and a second qubit communicatively coupled to the first qubit, the second qubit may be directly (i.e., with no intervening qubits, whether via a coupler or not) coupled to the first qubit only, and the second qubit may be made smaller than the first qubit. The main role of the second qubit of a hybrid qubit may be to adjust an effective programmable parameter of the hybrid qubit without affecting another effective programmable parameter of the hybrid qubit (i.e., achieving orthogonal control of non-orthogonal qubit parameters) hence denominated herein and in the claims as an adjustment or an orthogonal control qubit. The second qubit (i.e., adjustment or orthogonal control qubit) of a hybrid qubit may be galvanically coupled to the first qubit or it may be inductively coupled.

A chain of qubits comprising a first qubit communicatively coupled to a second qubit such that the chain of qubits may collectively behave as a logical qubit may not necessarily be a hybrid qubit. As used herein and in the claims, the term chain of qubits refer to sequences, series or linear sets of pair-wised communicatively coupled qubits, which terms are used interchangeably herein.

The qubits in the chain define or form a communicative path, from one outermost qubit to another outermost qubit, passing through one or more intermediary qubits and couplers. One of the outermost qubits is disposed in a first direction along the communicative path from the intermediary qubit(s), while the other one of the outermost qubits is disposed in a second direction along the communicative path from the intermediary qubit(s). The directions are with respect to a topology or geodesic defined by the communicative path, which may or may not be a Cartesian coordinate system. As used herein and in the claims the term directly coupled when used with respect to communicative coupling between two or more qubits, means a pair-wise communicative coupling between qubits, with no intervening qubits, whether those qubits are communicative coupled via one or more couplers or not.

A notable difference between such a chain of qubits comprising a first qubit and a second qubit communicatively coupled together and a hybrid qubit comprising a first qubit and an adjustment or orthogonal control qubit communicatively coupled to the first qubit is that each of the first qubit and the second qubit in a chain of qubits may also be communicatively coupled to at least another qubit for example, to increase the length of the chain of qubits. Whereas in a hybrid qubit, the first qubit may be communicatively coupled to the second qubit and to at least one other qubit, while the second or adjustment or orthogonal control qubit of the hybrid qubit may only be communicatively directly (i.e., with no intervening qubits, whether via a coupler or not) coupled to the first qubit of the hybrid qubit and communicatively directly coupled to no other qubits. That is, the adjustment or orthogonal control qubit is not communicatively coupled to any other qubits except possibly through the first qubit, thus having an "effective connectivity" of 1. In this respect, it is noted that connectivity has been used to refer to the maximum number of connections possible, assuming each coupler is active. "Effective connectivity" is used to refer to the fact that in use, the adjustment or orthogonal control qubit is not communicatively coupled between other qubits, but rather communicatively directly coupled (i.e., with no intervening qubits, whether via a coupler or not) to a single qubit, for instance galvanically or via a coupler, and other communicatively coupling being via the single qubit.

Therefore, unlike a chain, sequence, series or linear set of qubits comprising at least a first qubit and a second qubit communicatively coupled together, any of which may also be coupled to at least one other qubit, a hybrid qubit comprises a first qubit and a dedicated second qubit (i.e., the adjustment or orthogonal control qubit) communicatively coupled to the first qubit. As such, the adjustment or orthogonal control qubit of a hybrid qubit may act as a supporting member to the first qubit of the hybrid qubit such that an effective programmable parameter of the hybrid qubit may be adjusted by adjusting the corresponding programmable parameter of the adjustment or orthogonal control qubit. The first qubit of a hybrid qubit may be communicatively coupled to the first qubit of another hybrid qubit such that the two hybrid qubits may act as a single logical qubit. Therefore, throughout this specification and the appended claims, a hybrid qubit comprising a first qubit and a second qubit (i.e., adjustment or orthogonal control qubit) communicatively coupled to the first qubit as well as a plurality of hybrid qubits where the first qubit of each hybrid qubit may be communicatively coupled the first qubit of another hybrid qubit thereby forming a chain of communicatively coupled hybrid qubits programmed to behave as a single qubit may also be a logical qubit. In other words, a chain of qubits acting as a single qubit, a hybrid qubit as well as a plurality of communicatively coupled hybrid qubits acting as a single qubit may be called a logical qubit as in all three scenarios, a set of qubits are used to represent a single variable and therefore the set of qubits essentially behave as one qubit.

Figure 3:
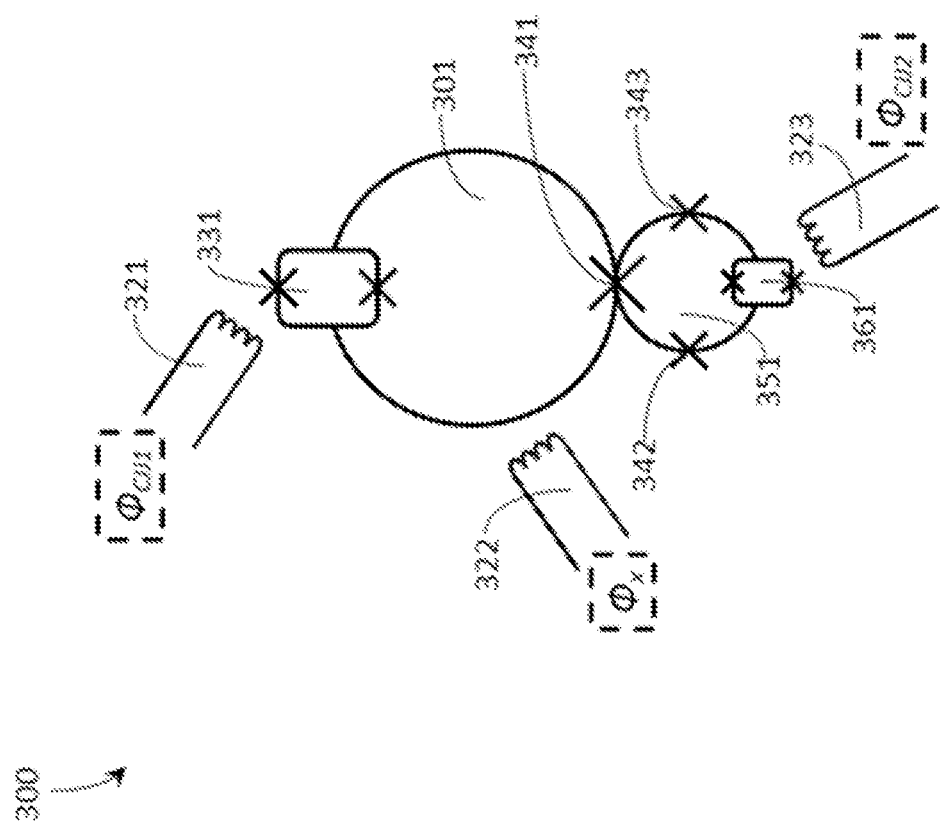
FIG. 3 is a schematic diagram of an exemplary hybrid qubit comprising a first qubit and a second qubit galvanically coupled to the first qubit via a Josephson junction, in accordance with the present systems and methods.

FIG. 3 shows an exemplary hybrid qubit 300 comprising first qubit 301 and second or adjustment or orthogonal control qubit 351 galvanically coupled to first qubit 301 via Josephson junction 341, in accordance with the present systems and methods. First qubit 301 may communicatively couple to other qubits in a quantum processor comprising a plurality of qubits (e.g., a plurality of hybrid qubits) while second or adjustment or orthogonal control qubit 351 may only couple to first qubit 301.

First qubit 301 of hybrid qubit 300 may have an associated tunneling amplitude and a persistent current. First qubit 301 comprises a loop of superconducting material interrupted by compound Josephson junction 331. Second or adjustment or orthogonal control qubit 351 may also have an associated tunneling amplitude and a persistent current. Second or adjustment or orthogonal control qubit 351 comprises a loop of superconducting material interrupted by compound Josephson junction 361 and at least one Josephson junction (for example, Josephson junctions 341, 342, 343). At least one Josephson junction 341 interrupts both the loop of superconducting material of first qubit 301 and the loop of superconducting material of second or adjustment or orthogonal control qubit 351. In other words, first qubit 301 and second or adjustment or orthogonal control qubit 351 are galvanically coupled together and at least one Josephson junction 341 is shared by both first qubit 301 and second or adjustment or orthogonal control qubit 351. The tunneling amplitude of first qubit 301 may be adjusted by a flux signal $\phi_{CJJ1}$ coupled into compound Josephson junction 331 via programming subsystem 321. Similarly, the tunneling amplitude of second or adjustment or orthogonal control qubit 351 may be adjusted by a flux signal $\phi_{CJJ2}$ coupled into compound Josephson junction 361 via programming subsystem 323. The persistent current of first qubit 301 may be adjusted by a flux signal $\phi_X$ coupled into the body of first qubit 301 via programming subsystem 322. Each of programming subsystems 321-323 may be realized by a respective inductive coupling structure, as illustrated, controlled by a programming system (not shown). Such a programming system may be separate from the quantum processor (not shown), or it may be included locally (i.e., on-chip with quantum the processor), for example, as described in U.S. Pat. Nos. 7,876,248 and 8,035,540. The tunneling amplitude of first qubit 301 and the tunneling amplitude of second or adjustment or orthogonal control qubit 351 together define an effective tunneling amplitude of hybrid qubit 300. Although hybrid qubit 300 comprises first qubit 301 galvanically coupled to second or adjustment or orthogonal control qubit 351, in alternative embodiments, first qubit 301 may be communicatively coupled to second or adjustment or orthogonal control qubit 351 either via a coupling device such that first qubit 301, second or adjustment or orthogonal control qubit 351, and the coupling device collectively behave as hybrid qubit 300, or without a coupling device and via direct inductive coupling that strongly magnetically couples first qubit 301 and second or adjustment or orthogonal control qubit 351 together. However, an advantage of galvanically coupling second or adjustment or orthogonal control qubit 351 to first qubit 301 as shown in FIG. 3 is a strong communicative coupling established between first qubit 301 and second or adjustment or orthogonal control qubit 351 and reduced noise susceptibility. Although second or adjustment or orthogonal control qubit 351 comprises compound Josephson junction 361 that may provide a tunable tunneling amplitude, in alternative embodiments, compound Josephson junction 361 may be replaced with a single Josephson junction in parallel connection with a tunable capacitor. However, adding a capacitor to replace compound Josephson junction 361 may add unwanted noise to hybrid qubit 300 and therefore may require additional structures to shield and/or reduce noise generated from the tunable capacitor. Josephson junctions of second or adjustment or orthogonal control qubit 351 such as Josephson junctions 342, 343 may provide the necessary inductance to strongly couple second or adjustment or orthogonal control qubit 351 to first qubit 301. Without Josephson junctions 342, 343, the structure of second or adjustment or orthogonal control qubit 351 may need to be larger (for example, by increasing the qubit loop length of second or adjustment or orthogonal control qubit 351) in order to achieve the necessary inductance. Therefore, forming Josephson junctions 342, 343 in second or adjustment or orthogonal control qubit 351 reduces the size (e.g., area, perimeter) of second or adjustment or orthogonal control qubit 351.

As previously described, the tunneling amplitude of a qubit may decrease when the qubit is communicatively coupled to another qubit or to a chain of communicatively coupled qubits in order to form a logical qubit. The decreasing tunneling amplitude may bring the qubit or logical qubit out of the quantum regime and into the classical regime, which disrupts normal operation of the quantum processor. Adjusting the tunneling amplitude of a qubit may affect the persistent current of that qubit which thereby changes qubit parameters such as the h and J terms of that qubit. Such changes made to the qubit parameters (for example, h and J) may be undesirable as the resulting problem embedded into the qubits of the quantum processor may not end up being the problem solved by the quantum processor since the parameters have changed or may be solved incorrectly. Therefore, the tunneling amplitude of a qubit (in, for example, a chain of qubits) needs to be adjusted/increased without affecting its persistent current.

Adjusting the tunneling amplitude of second or adjustment or orthogonal control qubit 351 of hybrid qubit 300 such that the tunneling amplitude of second or adjustment or orthogonal control qubit 351 is very large compared to the tunneling amplitude of first qubit 301 of hybrid qubit 300 ensures that the effective tunneling amplitude of hybrid qubit 300 is dominated by the tunneling amplitude of second or adjustment or orthogonal control qubit 351. Therefore, by only adjusting the tunneling amplitude of second or adjustment or orthogonal control qubit 351, the effective tunneling amplitude of hybrid qubit 300 may be adjusted or maintained.

The effective persistent current of hybrid qubit 300 may, at least in part depend on the persistent current of first qubit 301 without restricting the persistent current of second or adjustment or orthogonal control qubit 351. In the example of FIG. 3, the effective persistent current of hybrid qubit 300 is given by the persistent current of first qubit 301. The effective persistent current of hybrid qubit 300 is not substantially affected by the adjustment of the effective tunneling amplitude of hybrid qubit 300 via an adjustment to the tunneling amplitude of second or adjustment or orthogonal control qubit 351. Thus, the combination of first qubit 301 and second or adjustment or orthogonal control qubit 351 illustrated in FIG. 3 provides a hybrid qubit 300 having orthogonal control of two non-orthogonal effective programmable parameters: effective persistent current and effective tunneling amplitude. Furthermore, since second or adjustment or orthogonal control qubit 351 does not need to couple to anything other than first qubit 301, second or adjustment or orthogonal control qubit 351 does not need a large inductance and hence can be made physically smaller in size (e.g., area, perimeter) than first qubit 301. Multiple second qubits 351 may not take up a large portion of the chip area in a quantum processor comprising a plurality of similar hybrid qubits 300.

A logical qubit may be formed by communicatively coupling together at least two qubits as illustrated in FIG. 1. Similarly, in accordance with the present systems and methods, a logical qubit may be formed by communicatively coupling together at least two hybrid qubits (i.e., coupling a first hybrid qubit 300 to another hybrid qubit). This may allow for forming logical qubits with an increased number of communicatively coupled qubits (i.e., a longer chain of qubits) with each hybrid qubit comprising a tunable effective tunneling amplitude.

As described in FIG. 3, a hybrid qubit may comprise a first qubit and a second or adjustment or orthogonal control qubit galvanically coupled to the first qubit. The first qubit may comprise a loop of superconducting material interrupted by at least one Josephson junction. The second or adjustment or orthogonal control qubit may also comprise a loop of superconducting material interrupted by at least one Josephson junction. The second or adjustment or orthogonal control qubit loop may be smaller in size than the first qubit loop and hence have a very small inductance compared to the first qubit loop. The second or adjustment or orthogonal control qubit may be galvanically coupled to the first qubit via a large common Josephson junction with a single programming subsystem used to program a programmable parameter of the second qubit such as tunneling amplitude. Due to reduced size and therefore inductance, the second or adjustment or orthogonal control qubit may not produce a large magnetic flux and it may not couple to flux noise significantly and therefore, it advantageously may not reduce the decoherence time of the first qubit. Furthermore, the second or adjustment or orthogonal control qubit may not affect the capacitance of the first qubit. Having a second or adjustment or orthogonal control qubit galvanically coupled to the first qubit to form a hybrid qubit allows for achieving orthogonal control of otherwise non-orthogonal qubit parameters. For example, in order to adjust the effective tunneling amplitude of a hybrid qubit, only the tunneling amplitude of the second or adjustment or orthogonal control qubit may be adjusted. The tunneling amplitude of the second or adjustment or orthogonal control qubit may be very large so that it dominates the tunneling amplitude of the first qubit. The persistent current of the first qubit may not be substantially affected by the tunneling amplitude of the second or adjustment or orthogonal control qubit. Therefore, the second or adjustment or orthogonal control qubit of a hybrid qubit may act as a supporting member of the first qubit. A hybrid qubit may be a part of a larger system of hybrid qubits such as a quantum processor with controllable programmable qubit parameters.

Figure 4:
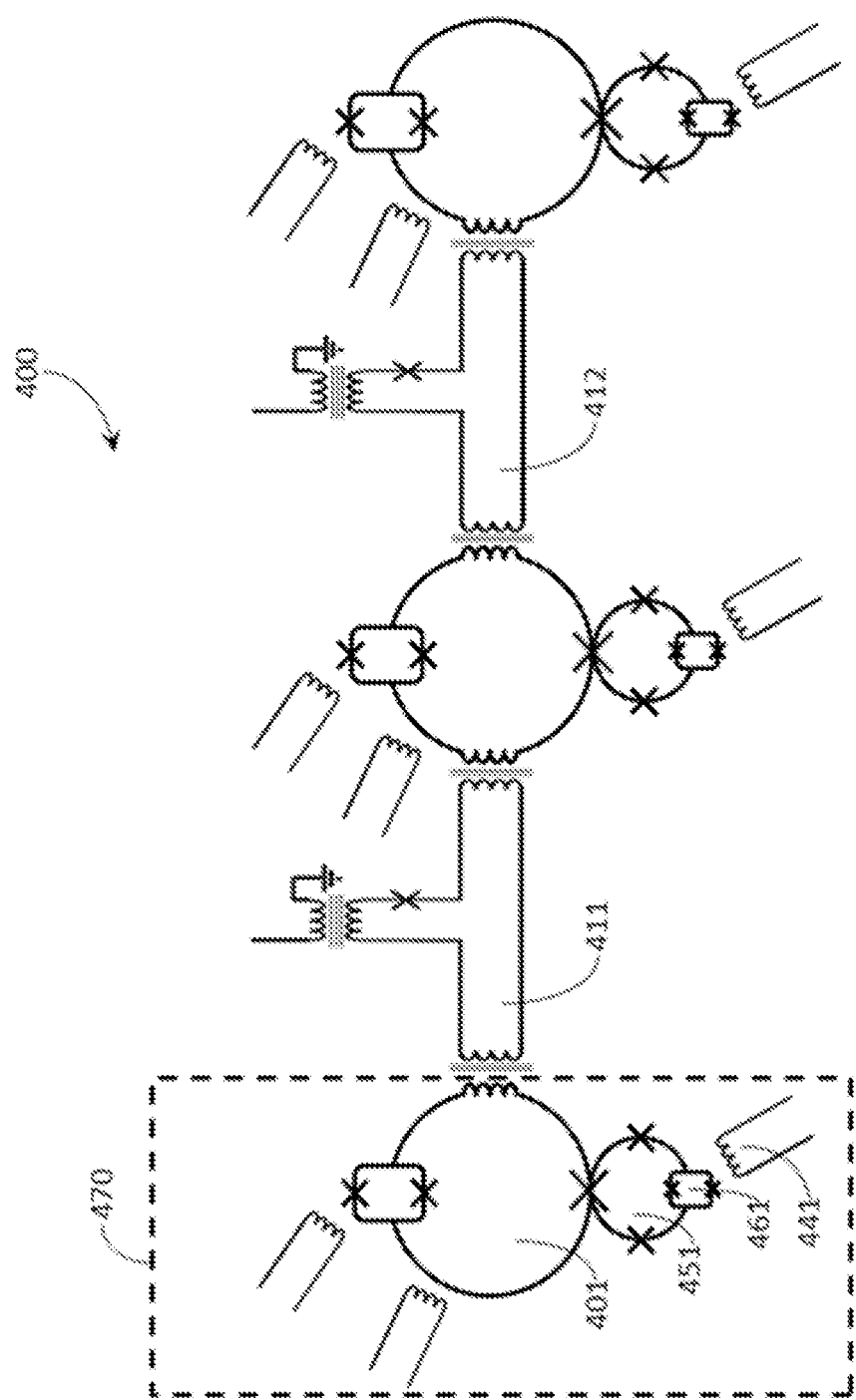
FIG. 4 is a schematic diagram of a logical qubit comprising three hybrid qubits and two tunable ZZ-couplers coupling information therebetween, in accordance with the present systems and methods.

FIG. 4 shows a logical qubit 400 comprising three hybrid qubits (for example, hybrid qubit 470; only hybrid qubit 470 is called out in FIG. 4 to reduce clutter) and two tunable ZZ-couplers 411, 412 coupling information therebetween. While logical qubit 400 shown in FIG. 4 includes three hybrid qubits 470 and two couplers 411, 412, those of skill in the art will appreciate that logical qubit 400 may include any number of hybrid qubits, and any number of coupling devices coupling information therebetween (for example, 2 hybrid qubits and 1 coupling device, 5 hybrid qubits and 4 coupling devices, etc.).

Each hybrid qubit 470 of logical qubit 400 may be substantially similar to hybrid qubit 300 from FIG. 3. For example, hybrid qubit 470 comprises a first qubit 401 (i.e., similar to first qubit 301 from FIG. 3) and a second qubit 451 (i.e., similar to second or adjustment or orthogonal control qubit 351 from FIG. 3) galvanically coupled to first qubit 401. Second qubit 451 is galvanically coupled to first qubit 401 to, for example, achieve a strong interaction between qubits 451 and 401. However, second qubit 451 and first qubit 401 may not be galvanically coupled in alternative embodiments as long as second qubit 451 is strongly coupled to first qubit 401 by communicative coupling means, such as via inductive coupling. In other words, first qubit 401 and second qubit 451 may be strongly coupled such that the orientation of first qubit 401 and second qubit 451 may always be similar to each other (either 1 or 0) and therefore one qubit may not have a bit flip that opposes the orientation of the other qubit. Logical qubit 400 may comprise an effective tunneling amplitude which may be derived from the effective tunneling amplitudes of the individual hybrid qubits 470 of logical qubit 400 and effective persistent current which may, for example, be derived from the effective persistent currents of the individual hybrid qubits 470 of logical qubit 400.

Communicatively coupling additional hybrid qubits to logical qubit 400 increases the effective length of logical qubit 400. Increasing the effective length of the logical qubits (by, for example, forming logical qubits with four or more individual qubits) increases the effective connectivity of the logical qubits in a quantum processor. This advantageously allows for more flexibility in embedding a problem into the quantum processor. Each hybrid qubit 470 in logical qubit 400 comprises an effective tunneling amplitude. For example, hybrid qubit 470 of logical qubit 400 comprises an effective tunneling amplitude which may depend on the tunneling amplitude of first qubit 401 and second qubit 451 galvanically coupled to first qubit 401.

Some problems may benefit from having communicatively coupled qubits in a logical qubit with an effective h parameter distributed among the communicatively coupled qubits in order to achieve better precision. This results in multiple qubits within a chain having non-zero individual h parameters which limits the number of qubits with freely adjustable parameters such as tunneling amplitude. Using hybrid qubits on the other hand may allow for controllably adjusting a tunneling amplitude within a logical qubit (and thereby adjusting the effective tunneling amplitude of the logical qubit) without affecting a persistent current within the logical qubit such that the h and J of the hybrid qubit may not be affected. Similar to hybrid qubit 300 of FIG. 3, by adjusting the tunneling amplitude of second qubit 451, the effective tunneling amplitude of hybrid qubit 470 may be adjusted or maintained. The tunneling amplitude of second qubit 451 may be adjusted by a flux signal coupled into compound Josephson junction 461 of second qubit 451 via programming subsystem 441. When the tunneling amplitude of second qubit 451 is adjusted so that the tunneling amplitude of second qubit 451 is very large compared to the tunneling amplitude of first qubit 401, the effective tunneling amplitude of hybrid qubit 470 may not be substantially affected by the tunneling amplitude of first qubit 401. Hence, the persistent current of first qubit 401 may also not be affected by a change in the tunneling amplitude of second qubit 451. Therefore, by only adjusting the tunneling amplitude of second qubit 451, the effective tunneling amplitude of hybrid qubit 470 may be adjusted without affecting the persistent current of first qubit 401 which achieves orthogonal control of otherwise non-orthogonal qubit parameters such as tunneling amplitude and persistent current. Likewise, by controllably adjusting the effective tunneling amplitude of any or all of the hybrid qubits of a logical qubit, the effective tunneling amplitude of the logical qubit may be maintained so that the logical qubit may continue to operate in the quantum regime despite the inclusion of multiple hybrid qubits within logical qubit 400 and the normal quantum annealing process may be unaffected.

Figure 5:
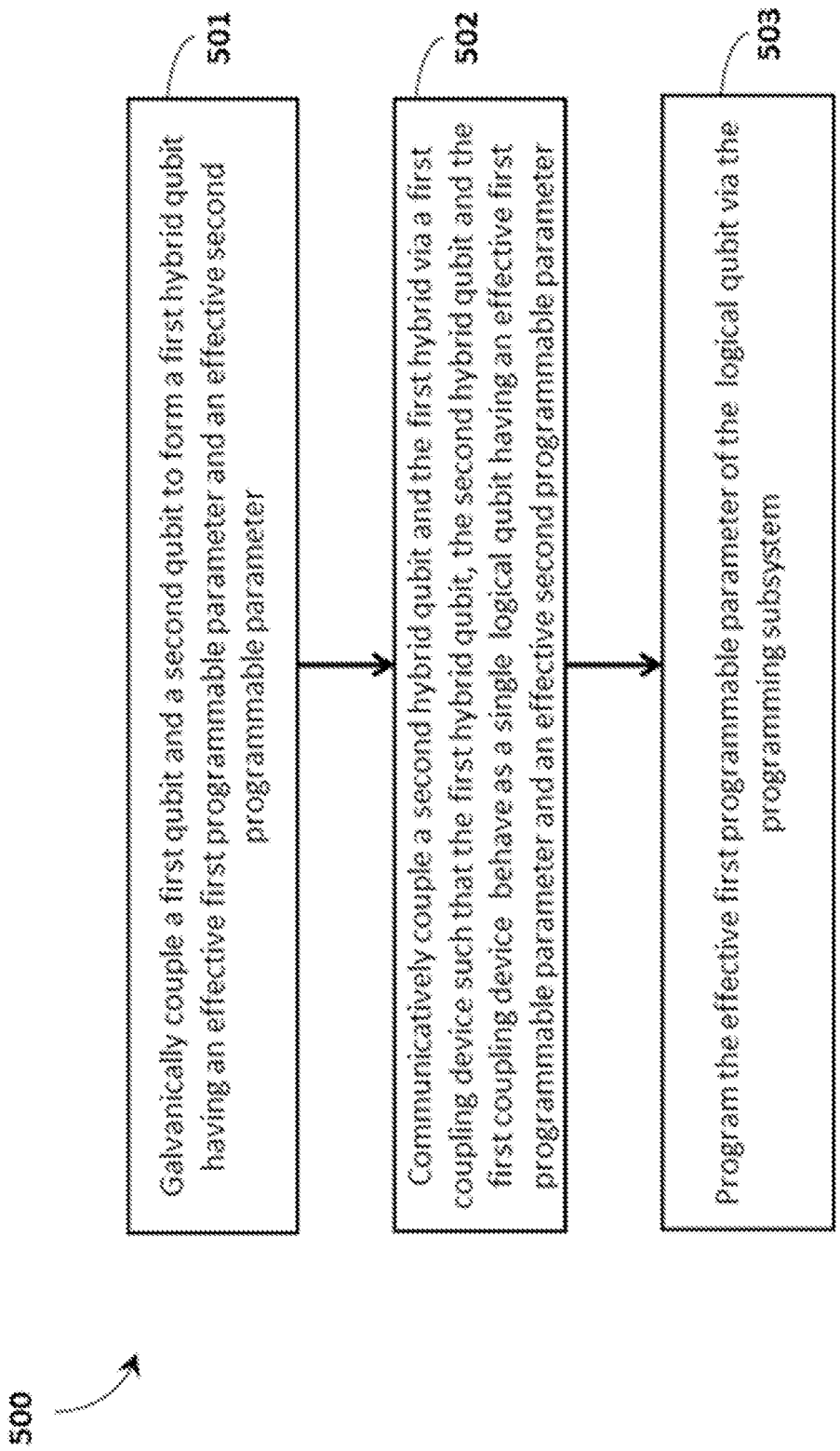
FIG. 5 is a flow-diagram of a method for achieving orthogonal control of at least two non-orthogonal qubit parameters in a quantum processor comprising a plurality of hybrid qubits, in accordance with the present systems and methods.

FIG. 5 shows a method 500 for achieving orthogonal control of at least two non-orthogonal qubit parameters in a quantum processor comprising a plurality of hybrid qubits. Method 500 includes three acts 501-503, though those of skill in the art will appreciate that in alternative embodiments certain acts may be omitted and/or additional acts may be added. Those of skill in the art will appreciate that the illustrated order of the acts is shown for exemplary purposes only and may change in alternative embodiments.

At 501, a first hybrid qubit is formed by galvanically coupling a first qubit and a second qubit together. The first hybrid qubit may have an effective first programmable parameter and an effective second programmable parameter. The effective first programmable parameter may, for example, depend on a first programmable parameter of the first qubit and a first programmable parameter of the second qubit, while the effective second programmable parameter may, for example, depend on a second programmable parameter of the first qubit. As described in FIG. 4, the effective first programmable parameter may be an effective tunneling amplitude of the first hybrid qubit while the effective second programmable parameter may be an effective persistent current of the first hybrid qubit. Similarly, the first programmable parameter of the first qubit in the first hybrid qubit may be a tunneling amplitude, the first programmable parameter of the second qubit in the first hybrid qubit may be a tunneling amplitude, and the second programmable parameter of the first qubit in the first hybrid qubit may be a persistent current.

At 502, a second hybrid qubit is communicatively coupled to the first hybrid qubit via a first coupling device such that the first hybrid qubit, the second hybrid qubit and the first coupling device behave as a single logical qubit having an effective first programmable parameter and an effective second programmable parameter where the effective first programmable parameter may be an effective tunneling amplitude and the effective second programmable parameter may be an effective persistent current. While the logical qubit described in FIG. 5 comprises 2 hybrid qubits, a logical qubit may comprise any number of communicatively coupled hybrid qubits. For example, a logical qubit may comprise 1 hybrid qubit, 3 hybrid qubits, 8 hybrid qubits and so on. The effective tunneling amplitude of the logical qubit depends on the effective tunneling amplitudes of the first hybrid qubit and the second hybrid qubit. Therefore, adjusting the effective tunneling amplitude of the first and/or the second hybrid qubit may affect the effective tunneling amplitude of the logical qubit.

At 503, the effective first programmable parameter (e.g., the effective tunneling amplitude) of the logical qubit is programmed via the programming subsystem. The effective tunneling amplitude of the logical qubit may be programmed by programming the respective effective tunneling amplitudes of any or all of the hybrid qubits comprised in the logical qubit (i.e., the first hybrid qubit and/or the second hybrid qubit). For example, the effective tunneling amplitude of logical qubit 400 as shown in FIG. 4 may be programmed by tuning the effective tunneling amplitude of any or all of the hybrid qubits such as hybrid qubit 470. Tuning the effective tunneling amplitude of a hybrid qubit was described earlier in FIG. 3.

Figure 6:
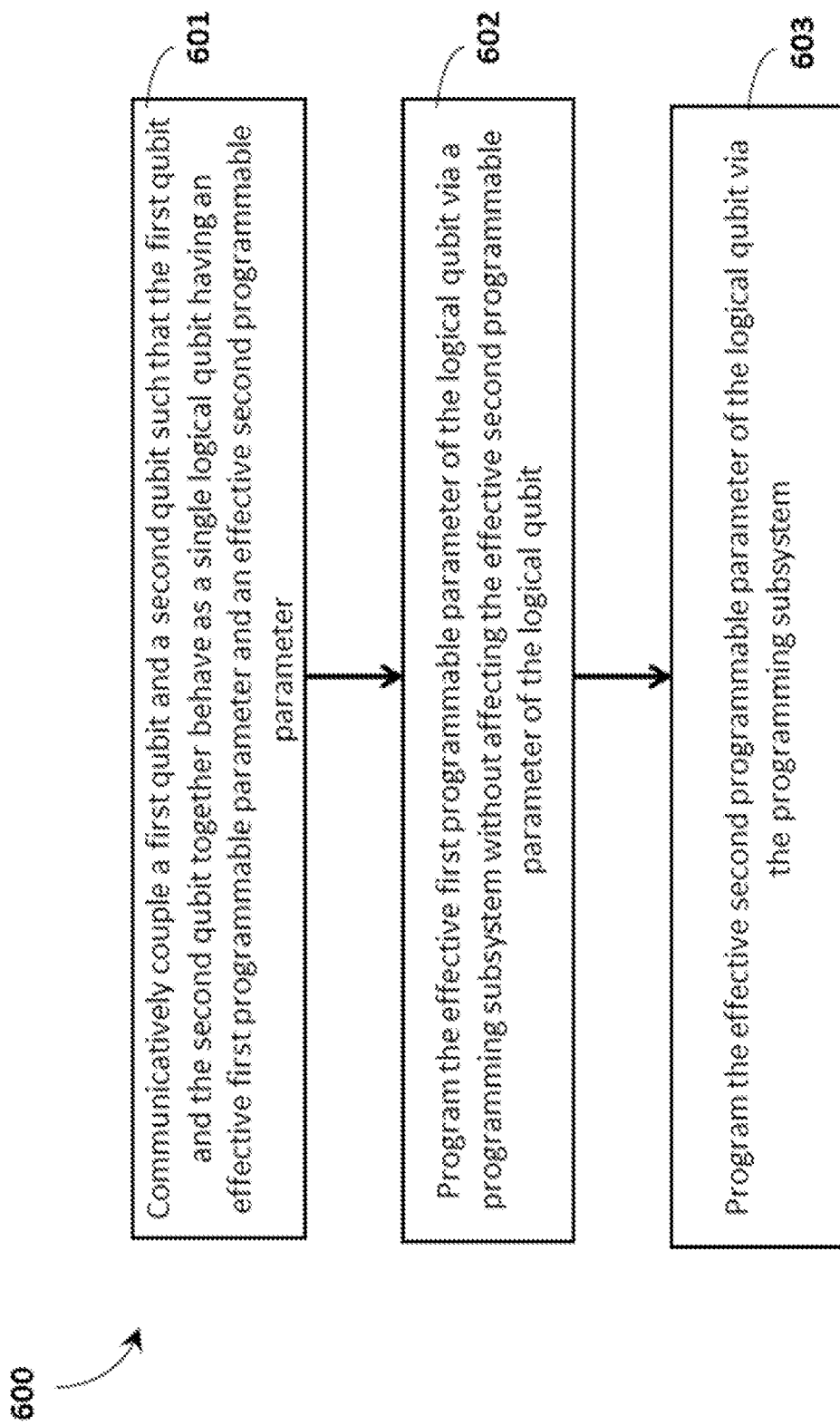
FIG. 6 is a flow-diagram of a general method for achieving orthogonal control of at least two non-orthogonal qubit parameters in a quantum processor, in accordance with the present systems and methods.

FIG. 6 shows a general method 600 for achieving orthogonal control of at least two non-orthogonal qubit parameters in a quantum processor. Method 600 includes three acts 601-603, though those of skill in the art will appreciate that in alternative embodiments certain acts may be omitted and/or additional acts may be added. Those of skill in the art will appreciate that the illustrated order of the acts is shown for exemplary purposes only and may change in alternative embodiments.

At 601, a first qubit and a second qubit are communicatively coupled such that the first qubit and the second qubit together behave as a single logical qubit having an effective first programmable parameter and an effective second programmable parameter. A logical qubit may comprise a first qubit and a second qubit as shown in FIG. 1 (e.g., qubits 101 and 102) or as shown in FIG. 3 (e.g., first qubit 301 and second or adjustment or orthogonal control qubit 351). The effective first and second programmable parameters of the logical qubit may be an effective tunneling amplitude and an effective persistent current, respectively. The first qubit and the second qubit may be communicatively coupled together via a coupling device such as coupling device 111 of FIG. 1 coupling qubits 101 and 102 together. Communicatively coupling the first and the second qubit may include ferromagnetically, anti-ferromagnetically, and/or transversely coupling the first and the second qubit. In alternative embodiments, the first qubit and the second qubit may be galvanically coupled as shown in FIG. 3 where first qubit 301 is galvanically coupled to second or adjustment or orthogonal control qubit 351 at Josephson junction 341.

At 602, effective first programmable parameter (i.e., effective tunneling amplitude) of the logical qubit is programmed via a programming subsystem without affecting the effective second programmable parameter (i.e., effective persistent current) of the logical qubit. The first qubit may have a first programmable parameter and a second programmable parameter. The second qubit may have at least a first programmable parameter. The first programmable parameter of the first qubit may be a tunneling amplitude of the first qubit, the second programmable parameter of the first qubit may be a persistent current of the first qubit, and the first programmable parameter of the second qubit may be a tunneling amplitude of the second qubit. The effective tunneling amplitude of the logical qubit may be programmed by adjusting the tunneling amplitude of the first qubit and/or the tunneling amplitude of the second qubit via the programming subsystem (for example, programming subsystem 121 and/or 123 of FIG. 1 and programming subsystem 323 of FIG. 3). As illustrated and described previously in reference to FIGS. 1 and 3, programming the effective tunneling amplitude of a logical qubit may not affect the effective persistent current of the logical qubit.

At 603, the effective second programmable parameter (i.e., effective persistent current) of the logical qubit is programmed via the programming subsystem. The effective persistent current of the logical qubit may, at least in part depend on the persistent current of the first qubit without restricting the persistent current of the second qubit. The effective persistent current of the logical qubit may be programmed by adjusting the persistent current of the first qubit and/or the persistent current of the second qubit. A programming subsystem may be used to adjust the persistent current of the first and/or second qubit which ultimately adjusts the effective persistent current of the logical qubit. For example, programming subsystems 122 and 124 of FIG. 1 as well as programming subsystem 322 of FIG. 3 may each be used to adjust the persistent current of respective qubits 101, 102 of FIG. 1 and respective first qubit 301 of FIG. 3. The tunable persistent current of qubits 101 and 102 of FIG. 1 defines the effective persistent current of the logical qubit comprising qubits 101 and 102. The tunneling amplitude of, for example, the second qubit of the logical qubit may not affect the persistent current of the first qubit of the logical qubit. For example, as described in FIG. 3, adjusting the tunneling amplitude of second or adjustment or orthogonal control qubit 351 may affect the effective tunneling amplitude of hybrid qubit 300 (i.e., the logical qubit). However, as previously described, the change in effective tunneling amplitude of the logical qubit may not substantially affect the effective persistent current of the logical qubit which achieves orthogonal control of otherwise non-orthogonal qubit parameters.

Method 600 may be used to achieve orthogonal control of non-orthogonal parameters of a hybrid qubit or a plurality of communicatively coupled qubits behaving as a single logical qubit. As such, method 600 may be used with logical qubits comprising qubit loops communicatively coupled via coupling devices (for example, logical qubit 100 of FIG. 1 comprising qubits 101, 102, 103 and coupling devices 111, 112) as well as with a hybrid qubit comprising a first qubit communicatively/galvanically coupled to a second qubit (for example, hybrid qubit 300 of FIG. 3 comprising first qubit 301 and second or adjustment or orthogonal control qubit 351). A logical qubit may comprise a single hybrid qubit such as hybrid qubit 300 of FIG. 3. A logical qubit may also comprise a plurality of communicatively coupled hybrid qubits such as logical qubit 400 of FIG. 4.

Although it may be desirable to form a hybrid qubit comprising a first qubit galvanically coupled to a second qubit, galvanic coupling of qubits is not necessary. As such, in alternative embodiments, a first qubit may be communicatively coupled to a second qubit via non-galvanic means such that the two communicatively coupled qubits may behave as a hybrid qubit. The coupling established between the two qubits may be inductive. As long as the first qubit and the second qubit are strongly coupled to each other, the type of coupling established between the two qubits (e.g., galvanic or inductive) does not matter. In other words, the first qubit and the second qubit may be strongly coupled such that the orientation of the first qubit and the second qubit may always be similar to each other (either 1 or 0) and therefore one qubit may not have a bit flip that opposes the orientation of the other qubit. The second qubit of the hybrid qubit may comprise a compound Josephson junction that may be programmed via a programming subsystem to provide a tunable tunneling amplitude. In alternative embodiments, the compound Josephson junction of the second qubit may be replaced with a single Josephson junction in parallel connection with a tunable capacitor. However, adding a capacitor to replace the compound Josephson junction may add unwanted noise to the hybrid qubit and therefore may require additional structure(s) to shield and/or reduce noise generated from the tunable capacitor. Therefore, the second qubit of the hybrid qubit may comprise a compound Josephson junction to adjust the tunneling amplitude, a large Josephson junction to galvanically couple the first qubit to the second qubit and at least one additional Josephson junction. The at least one additional Josephson junction of the second qubit generates the necessary inductance needed to strongly couple the second qubit to the first qubit of the hybrid qubit. Without the at least one additional Josephson junction, the structure of the second qubit may need to be larger in size (i.e., the qubit loop length of the second qubit may need to be increased) in order to achieve the necessary inductance. Therefore, forming at least one additional Josephson junction in the second qubit of the hybrid qubit reduces the size of the second qubit.

Throughout this specification and the appended claims, the term "superconducting" when used to describe a physical structure such as a "loop of superconducting material" is used to indicate a material that is capable of behaving as a superconductor at an appropriate temperature. A superconducting material may not necessarily be acting as a superconductor at all times in all embodiments of the present systems and methods.

A programmable parameter of a qubit may be a parameter that can be adjusted in order to solve a problem using a quantum processor. Examples of programmable parameters include: tunneling amplitude, persistent current, spin (h), coupling strength (J), etc. Some programmable parameters may have a direct or indirect effect on other programmable parameters. Achieving orthogonal control of such non-orthogonal parameters is a challenge that is addressed in the present systems and methods by the use of logical qubits and/or hybrid qubits.

Programmable parameters of a qubit may be programmed using a dedicated programming subsystem. For example, as shown in FIG. 1, a first programmable parameter such as the tunneling amplitude of qubit 101 may be adjusted by programming the respective programming subsystem 121 and a second programmable parameter such as the persistent current of qubit 101 may be adjusted by programming the respective programming subsystem 122. A programming subsystem may be realized, for example, by an inductive coupling structure to a programming system. Such a programming system may be separate from the quantum processor, or it may be included locally (i.e., on-chip with the quantum processor) as described in U.S. Pat. Nos. 7,876,248 and 8,035,540.

A qubit may be communicatively coupled to another qubit via a coupling device so that the two qubits and the coupling device collectively behave as a single logical qubit. A logical qubit may also be a single hybrid qubit. Further still, a logical qubit may be formed by communicatively coupling a hybrid qubit and another hybrid qubit via a coupling device. A logical qubit may therefore have any number of qubits/hybrid qubits (for example, 2 qubits/hybrid qubits, 5 qubits/hybrid qubits, 9 qubits/hybrid qubits, etc.) A pair of qubits/hybrid qubits in a logical qubit may be communicatively coupled via a coupling device. A logical qubit comprising two or more qubits/hybrid qubits may improve the effective connectivity of a quantum processor comprising a plurality of qubits. This improved effective connectivity gives more flexibility in embedding problems (i.e., assigning variables in a problem to qubits) into the quantum processor and may speed up processing time.

A qubit/hybrid qubit may be communicatively coupled to another qubit/hybrid qubit via a coupling device to form a logical qubit. Throughout this specification and the appended claims, the terms "communicative" or "communicatively" when used to describe coupling between two qubits or hybrid qubits is used to describe any form of coupling information between qubits (including but not limited to ferromagnetic coupling, anti-ferromagnetic coupling, and transverse coupling) such that the pair of coupled qubits or hybrid qubits may be in communication with each other.

A hybrid qubit may comprise a first qubit galvanically coupled to a second qubit. However, in alternate embodiments, the first qubit of a hybrid qubit may be strongly inductively coupled to the second qubit of the hybrid qubit. Throughout this specification and the appended claims, the terms "strong" or "strongly" when used to describe the coupling strength established between the two qubits of a hybrid qubit describes the first qubit of a hybrid qubit that is communicatively coupled to the second qubit of a hybrid qubit such that the orientation of the first qubit and the second qubit of the hybrid qubit may remain similar to each other and the coupling strength established between the pair of qubits may be strong enough to prevent one qubit from flipping with respect to the other qubit of the hybrid qubit. In other words, both the first qubit and the second qubit of the hybrid qubit may represent either a logical '1' or logical '0'.

A logical qubit may at least comprise an effective first programmable parameter and an effective second programmable parameter. Such effective programmable parameters may depend on the individual programmable parameters of the qubits that make up a logical qubit. For example, the effective first programmable parameter of a logical qubit may be an effective tunneling amplitude of the logical qubit which may depend on the individual tunneling amplitudes of the qubits that make up the logical qubit. In other words, adjusting the tunneling amplitude of a qubit in a logical qubit may impact the overall (i.e., effective) tunneling amplitude of the logical qubit. Therefore, throughout this specification and the appended claims, the term "effective" when used to describe a programmable parameter, describes the overall value/characteristic of the programmable parameter that influences or defines the behavior of a logical qubit and is the result of a combination of similar individual programmable parameters that make up the effective programmable parameter. Similarly, throughout this specification and the appended claims, the term "effective" when used to describe a connectivity of a logical qubit (i.e., effective connectivity), describes the maximum number of possible communicative coupling paths that are physically available (e.g., whether active or not) to communicably couple between logical qubits and individual qubits in a quantum processor with the use of intervening qubits comprised in the logical qubit.

Figure 7:
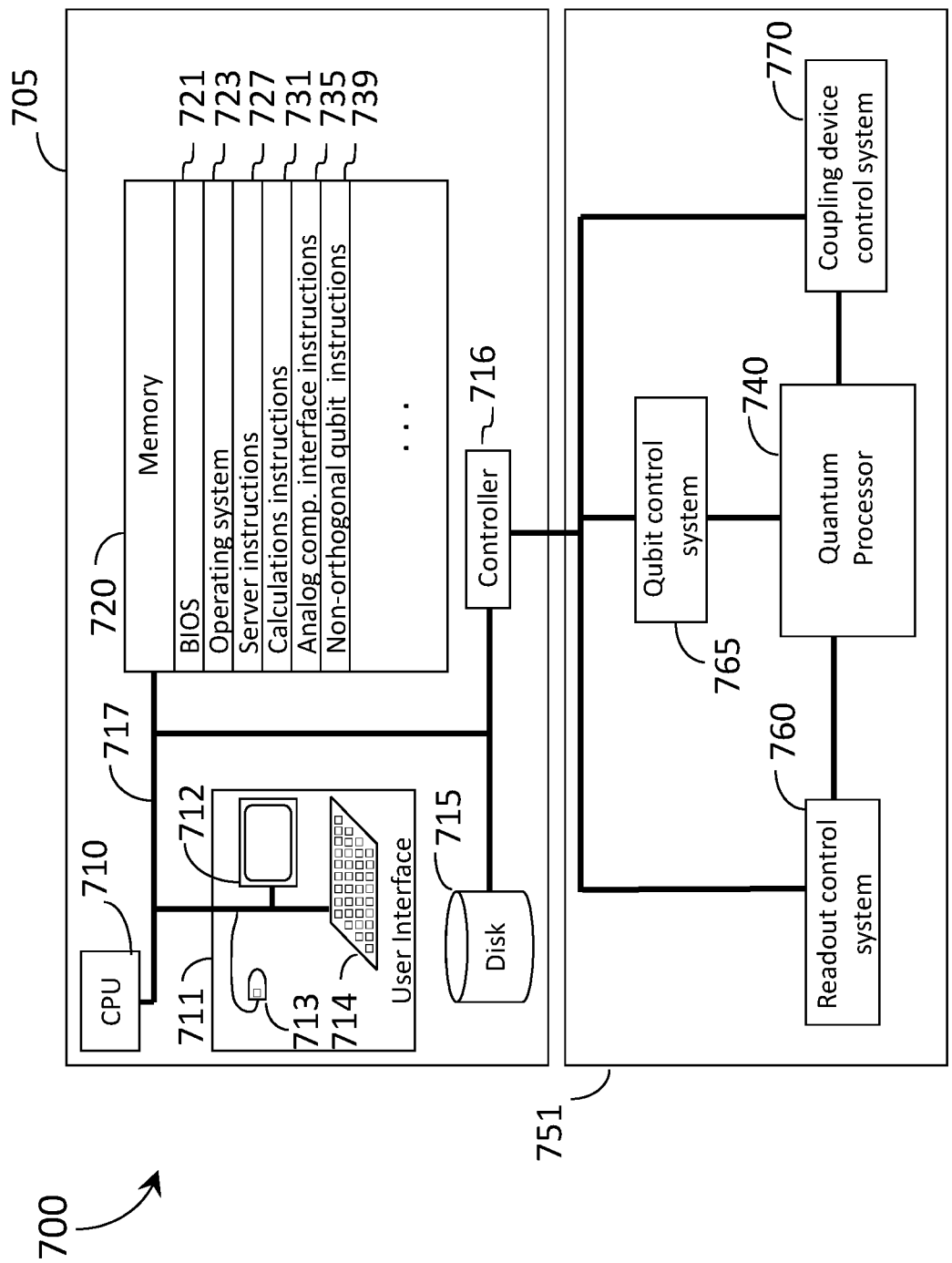
FIG. 7 is a schematic diagram that illustrates an exemplary hybrid computer including a digital processor and an analog processor in accordance with the present systems and methods.

FIG. 7 illustrates computing system 700 including a digital computer 705 coupled to an analog computer 751. In some embodiments the analog computer 751 is a quantum computer and the digital computer 705 is a classical computer. The exemplary digital computer 705 includes a digital processor that may be used to perform classical digital processing tasks described in the present systems and methods. Those skilled in the relevant art will appreciate that the present systems and methods can be practiced with other digital computer configurations, including hand-held devices, multiprocessor systems, microprocessor-based or programmable consumer electronics, personal computers ("PCs"), network PCs, mini-computers, mainframe computers, and the like, when properly configured or programmed to form special purpose machines, and/or when communicatively coupled to control an analog computer, for instance a quantum computer.

Digital computer 705 will at times be referred to in the singular herein, but this is not intended to limit the application to a single digital computer. The present systems and methods can also be practiced in distributed computing environments, where tasks or sets of instructions are performed or executed by remote processing devices, which are linked through a communications network. In a distributed computing environment sets of instruction, sometimes known as program modules, may be located in both local and remote memory storage devices.

Digital computer 705 may include at least one digital processor (such as, central processor unit 710), at least one system memory 720, and at least one system bus 717 that couples various system components, including system memory 720 to central processor unit 710.

The digital processor may be any logic processing unit, such as one or more central processing units ("CPUs"), graphics processing units ("GPUs"), digital signal processors ("DSPs"), application-specific integrated circuits ("ASICs"), field-programmable gate arrays ("FPGAs"), etc. Unless described otherwise, the construction and operation of the various blocks shown in FIG. 7 are of conventional design. As a result, such blocks need not be described in further detail herein, as they will be understood by those skilled in the relevant art.

Digital computer 705 may include a user input/output subsystem 711. In some embodiments, the user input/output subsystem includes one or more user input/output components such as a display 712, mouse 713, and/or keyboard 714. System bus 717 can employ any known bus structures or architectures, including a memory bus with a memory controller, a peripheral bus, and a local bus. System memory 720 may include non-volatile memory, such as read-only memory ("ROM"), static random access memory ("SRAM"), Flash NAND; and volatile memory such as random access memory ("RAM") (not shown). An basic input/output system ("BIOS") 721, which can form part of the ROM, contains basic routines that help transfer information between elements within digital computer 705, such as during startup.

Digital computer 705 may also include other non-volatile memory 715. Non-volatile memory 715 may take a variety of forms, including: a hard disk drive for reading from and writing to a hard disk, an optical disk drive for reading from and writing to removable optical disks, and/or a magnetic disk drive for reading from and writing to magnetic disks. The optical disk can be a CD-ROM or DVD, while the magnetic disk can be a magnetic floppy disk or diskette. Non-volatile memory 715 may communicate with digital processor via system bus 717 and may include appropriate interfaces or controllers 716 coupled to system bus 717. Non-volatile memory 715 may serve as long-term storage for computer-readable instructions, data structures, sets of processor readable instruction (also called program modules) and other data for digital computer 705.

Although digital computer 705 has been described as employing hard disks, optical disks and/or magnetic disks, those skilled in the relevant art will appreciate that other types of non-volatile computer-readable media may be employed, such a magnetic cassettes, flash memory cards, Flash, ROMs, smart cards, etc. Those skilled in the relevant art will appreciate that some computer architectures conflate volatile memory and non-volatile memory. For example, data in volatile memory can be cached to non-volatile memory. Or a solid-state disk that employs integrated circuits to provide non-volatile memory. Some computers place data traditionally stored on disk in memory. As well, some media that is traditionally regarded as volatile can have a non-volatile form, e.g., Non-Volatile Dual In-line Memory Module variation of Dual In Line Memory Modules.

Various sets of computer- or processor-readable instructions, application programs and/or data can be stored in system memory 720. For example, system memory 720 may store an operating system 723, and a set of computer- or processor-readable server instructions 727. In some embodiments, the set of server instructions 727 includes instruction for communicating with remote clients and scheduling use of resources including resources on the digital computer 705 and analog computer 751. For example, a Web server application and/or Web client or browser application for permitting digital computer 705 to exchange data with sources via the Internet, corporate Intranets, or other networks, as well as with other server applications executing on server computers.

In some embodiments system memory 720 may store a set of computer- or processor-readable calculation instructions 731 to perform pre-processing, co-processing, and post-processing to analog computer 751. In accordance with the present systems and methods, system memory 720 may store at set of analog computer interface instructions 735 operable to interact with the analog computer 751.

In some embodiments system memory 720 may store a set of non-orthogonal qubits instructions 739. For example, the set of non-orthogonal qubits instructions 739 can implement the methods like those described in FIG. 6 on digital computer 705 and analog computer 751. In some examples, the set of non-orthogonal qubits instructions 739 can be used to control non-orthogonal qubit parameters. In some examples of the present invention, the set of non-orthogonal qubits instructions 739 can be used to implement the methods shown in FIGS. 2, 5 and 6.

While shown in FIG. 7 as being stored in system memory 720, the sets of instructions shown and other data can also be stored elsewhere including in nonvolatile memory 715.

The analog computer 751 is provided in an isolated environment (not shown). For example, where the analog computer 751 is a quantum computer, the environment shields the internal elements of the quantum computer from heat, magnetic field, and the like. The analog computer 751 includes an analog processor 740. Examples of an analog processor include quantum processors such as the portions of those shown in FIGS. 1, 3 and 4.

A quantum processor includes programmable elements such as qubits, couplers, and other devices. The qubits are readout via readout out system 760. These results are fed to the various sets of computer or processor readable instructions for the digital computer 705 including the set of server instructions 727, the set of calculation instructions 731, the set of analog computer interface instructions 735, or other sets of instructions stored in nonvolatile memory 715, returned over a network or the like. The qubits include those shown in FIGS. 1, 3 and 4 and include hybrid qubits, such as, qubit 300 and qubit 470. The qubits are controlled via qubit control system 765. The qubit control system 765 includes programming subsystems, such as, programming subsystems 121, 123, and 125. The couplers are controlled via coupler control system 770. The coupler control system 770 includes programming subsystems, such as, programming subsystems 141 and 142. In some examples of the qubit control system 765 and the coupler control system 770 are used to control couplers like couplers 111, 112, 411 and 412 as described herein on analog processor 740.

In some examples the digital computer 705 can operate in a networking environment using logical connections to at least one client computer system. In some examples the digital computer 705 is coupled via logical connections to at least one database system. These logical connections may be formed using any means of digital communication, for example, through a network, such as a local area network ("LAN") or a wide area network ("WAN") including, for example, the Internet. The networking environment may include wired or wireless enterprise-wide computer networks, intranets, extranets, and/or the Internet. Other examples may include other types of communication networks such as telecommunications networks, cellular networks, paging networks, and other mobile networks. The information sent or received via the logical connections may or may not be encrypted. When used in a LAN networking environment, digital computer 705 may be connected to the LAN through an adapter or network interface card ("NIC") (communicatively linked to system bus 717). When used in a WAN networking environment, digital computer 105 may include an interface and modem (not shown), or a device such as NIC, for establishing communications over the WAN. Non-networked communications may additionally, or alternatively be employed.

Throughout this specification and the appended claims, the term "ferromagnetic region" when used to describe for example the susceptibility of a coupling device is used to describe a range of flux biases that may be applied to a coupling device such that a pair of superconducting devices communicatively coupled by the coupling device is ferromagnetically coupled. Similarly, throughout this specification and the appended claims, the term "anti-ferromagnetic region" when used to describe for example the susceptibility of a coupling device is used to describe a range of flux biases that may be applied to a coupling device such that a pair of superconducting devices communicatively coupled by the coupling device is anti-ferromagnetically coupled.

Throughout this specification and the appended claims, the terms "coupler" and "coupling device" are used interchangeably. However, both "coupler" and "coupling device" are used to describe a coupling loop of superconducting material interrupted by at least one Josephson junction that may be used to ferromagnetically, or anti-ferromagnetically couple a pair of superconducting devices together. Furthermore, throughout this specification and the appended claims, the phrase "a pair of communicatively coupled superconducting devices" is used to describe a pair of superconducting devices that may be ferromagnetically, or anti-ferromagnetically coupled together by a coupling device.

Throughout this specification and the appended claims, the term "superconducting" when used to describe a physical structure such as a "loop of superconducting material" is used to indicate a material that is capable of behaving as a superconductor at an appropriate temperature. A superconducting material may not necessarily be acting as a superconductor at all times in all embodiments of the present systems and methods.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other systems and methods of superconducting circuits, not necessarily the exemplary methods for quantum computation generally described above.

The various embodiments described above can be combined to provide further embodiments. All of the U.S. patents, U.S. patent application publications, U.S. patent applications, International (PCT) patent applications referred to in this specification and/or listed in the Application Data Sheet including U.S. provisional patent application Ser. No. 61/857,601 filed Jul. 23, 2013, are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A quantum processor comprising a plurality of hybrid qubits, wherein each hybrid qubit comprises:
   a respective first qubit comprising:
      a first qubit loop formed by a first closed superconducting current path; and
      a compound Josephson junction that interrupts the first qubit loop;
   a respective second qubit comprising:
      a second qubit loop formed by a second closed superconducting current path;
      a first Josephson junction that interrupts the second qubit loop; and a compound Josephson junction that interrupts the second qubit loop;
a respective first programming subsystem communicatively coupleable to the compound Josephson junction of the respective first qubit;
a respective second programming subsystem communicatively coupleable to the first qubit loop of the respective first qubit; and
a respective third programming subsystem communicatively coupleable to the compound Josephson junction of the respective second qubit,
wherein the second qubit loop of the respective second qubit is galvanically coupled to the first qubit loop of the respective first qubit such that a portion of the second closed superconducting current path includes a portion of the first closed superconducting current path and is shared between the first and second closed superconducting current paths and wherein the first Josephson junction that interrupts the second qubit loop interrupts the portion of the second closed superconducting current path that is shared between the first and second closed superconducting current paths.

2. The quantum processor of claim 1 wherein each respective second qubit further comprises a second Josephson junction that interrupts the second qubit loop, and wherein the second Josephson junction that interrupts the second qubit loop interrupts a portion of the second closed superconducting current path that is not shared between the first and second closed superconducting current paths.

3. The quantum processor of claim 1 wherein each respective first qubit comprises a respective first programmable parameter that is controlled by the respective first programming subsystem communicatively coupleable to the compound Josephson junction of the respective first qubit and a respective second programmable parameter that is controlled by the respective second programming subsystem communicatively coupleable to the first qubit loop of the respective first qubit, and wherein, for each respective first qubit, the respective second programmable parameter at least partially depends on the respective first programmable parameter.

4. The quantum processor of claim 3 wherein each respective second qubit comprises a respective first programmable parameter that is controlled by the respective third programming subsystem communicatively coupleable to the compound Josephson junction of the respective second qubit, and wherein the respective second programmable parameter of each respective first qubit is independent of the respective first programmable parameter of the respective second qubit to which the respective first qubit is galvanically coupled, such that the respective first programmable parameter of each respective second qubit does not affect the respective second programmable parameter of the respective first qubit to which the respective second qubit is galvanically coupled.

5. The quantum processor of claim 3 wherein, for each respective first qubit, the respective first programmable parameter is a respective tunneling amplitude of the respective first qubit and the respective second programmable parameter is a respective persistent current in the first qubit loop of the respective first qubit, and wherein, for each respective second qubit, the respective first programmable parameter is a respective tunneling amplitude of the respective second qubit.

6. The quantum processor of claim 3 wherein each hybrid qubit further comprises:
a respective effective first programmable parameter that at least partially depends on the respective first programmable parameter of the respective first qubit and the respective first programmable parameter of the respective second qubit; and
a respective effective second programmable parameter that at least partially depends on the respective second programmable parameter of the respective first qubit, and
such that each hybrid qubit behaves as a respective logical qubit.

7. The quantum processor of claim 6 wherein, for each respective hybrid qubit, the respective effective first programmable parameter is an effective tunneling amplitude of the respective hybrid qubit and the respective effective second programmable parameter is an effective persistent current of the respective hybrid qubit.

8. The quantum processor of claim 1, further comprising:
a plurality of coupling devices, wherein each respective coupling device is communicatively coupleable to a respective first qubit in a respective first hybrid qubit and a respective first qubit in a respective second hybrid qubit such that each respective coupling device provides communicative coupling between a respective pair of hybrid qubits.

9. The quantum processor of claim 8 wherein each respective coupling device comprises a respective loop of superconducting material interrupted by at least one respective Josephson junction, and wherein each respective coupling device is communicatively coupleable to a respective first qubit in a respective first hybrid qubit via galvanic or inductive coupling and to a respective first qubit in a respective second hybrid qubit via galvanic or inductive coupling.

10. The quantum processor of claim 9 wherein a first hybrid qubit and a second hybrid qubit are communicatively coupleable via a first coupling device to behave as a first logical qubit comprising:
an effective first programmable parameter that depends on the first programmable parameter of the first qubit in the first hybrid qubit, the first programmable parameter of the second qubit in the first hybrid qubit, the first programmable parameter of the first qubit in the second hybrid qubit, and the first programmable parameter of the second qubit in the second hybrid qubit; and
an effective second programmable parameter that depends on the second programmable parameter of the first qubit in the first hybrid qubit and the second programmable parameter of the first qubit in the second hybrid qubit,
wherein the effective first programmable parameter of the first logical qubit is independent of the effective second programmable parameter of the first logical qubit such that the effective first programmable parameter of the first logical qubit does not affect the effective second programmable parameter of the first logical qubit.

* * * * *